United States Patent
Awad et al.

(10) Patent No.: US 7,590,181 B2
(45) Date of Patent: Sep. 15, 2009

(54) ADAPTIVE MODULATION AND CODING

(75) Inventors: Yassin Aden Awad, Southhall Middlesex (GB); Sunil Keshavji Vadgama, Ashford Middlesex (GB)

(73) Assignee: Fujitsu Limited, Kawasaki (JP)

(*) Notice: Subject to any disclaimer, the term of this patent is extended or adjusted under 35 U.S.C. 154(b) by 577 days.

(21) Appl. No.: 10/901,901

(22) Filed: Jul. 29, 2004

(65) Prior Publication Data

US 2005/0025254 A1    Feb. 3, 2005

(30) Foreign Application Priority Data

Jul. 31, 2003    (GB)    ................... 0317968.6

(51) Int. Cl.
*H04L 27/00*    (2006.01)
(52) U.S. Cl. .................. 375/259; 375/222; 375/295; 332/108; 332/119; 332/151; 455/102; 714/759
(58) Field of Classification Search ................ 375/219, 375/220, 222, 259, 275, 295, 316, 340; 332/108, 332/119, 151; 329/316; 455/73, 102, 142, 455/205; 714/746, 748, 750, 759
See application file for complete search history.

(56) References Cited

U.S. PATENT DOCUMENTS

| | | | | |
|---|---|---|---|---|
| 5,559,810 A * | 9/1996 | Gilbert et al. | ................ | 714/704 |
| 5,764,699 A * | 6/1998 | Needham et al. | ............ | 375/261 |
| 6,208,663 B1 * | 3/2001 | Schramm et al. | ............ | 370/465 |
| 6,385,462 B1 * | 5/2002 | Baum et al. | ................. | 455/522 |
| 6,802,035 B2 * | 10/2004 | Catreux et al. | .............. | 714/746 |
| 6,909,758 B2 * | 6/2005 | Ramesh et al. | ............... | 375/340 |
| 7,050,488 B2 * | 5/2006 | Miyoshi et al. | ............. | 375/219 |
| 7,072,413 B2 * | 7/2006 | Walton et al. | ................ | 375/267 |
| 7,191,381 B2 * | 3/2007 | Gesbert et al. | .............. | 714/759 |
| 7,197,084 B2 * | 3/2007 | Ketchum et al. | ............ | 375/296 |
| 7,277,492 B2 * | 10/2007 | Itoh | ........................... | 375/259 |

(Continued)

FOREIGN PATENT DOCUMENTS

EP    1 289 181 A1    3/2003

(Continued)

OTHER PUBLICATIONS

Partial European Search Report dated Jun. 16, 2005.

(Continued)

*Primary Examiner*—Dac V Ha
(74) *Attorney, Agent, or Firm*—Katten Muchin Rosenman LLP

(57) ABSTRACT

In an adaptive modulation and coding method one or more adjustable values are created (S1), each corresponding to at least one of a plurality of available modulation and coding levels applicable to a signal transmitted from a transmitter to a receiver, and each representing a change to the level(s) to which it corresponds. One or more of said adjustable values is/are adjusted in dependence upon whether or not the signal is received successfully by the receiver (S2-S5). One of said available modulation and coding levels is selected (S6-S8) to apply to the signal based on such an adjustable value. Such a method can enable the appropriate modulation and coding level to be selected even when the path and channel conditions vary. The method is applicable to selecting modulation and coding levels in a high-speed downlink packet access system of a wireless communication network.

20 Claims, 17 Drawing Sheets

U.S. PATENT DOCUMENTS

2002/0099529 A1    7/2002    Tang
2003/0123598 A1    7/2003    Gollamudi et al.

FOREIGN PATENT DOCUMENTS

EP    1 387 517    2/2004

OTHER PUBLICATIONS

Arnab Das, et al. Adaptive, Asynchronous Incremental Redundancy ($A^2$IR) With Fixed Transmission Time Intervals (TTI) for HSDPA. Personal, Indoor and Mobile Radio Communications, 2002 pp. 1083-1087.

Motorola. HSDPA CQI Proposal. Apr. 9, 2002.

NEC, Telecom MODUS. Selection of MCS levels in HSDPA. May 21, 2001, XP002262799, pp. 1-4.

European Search Report dated Oct. 20, 2003.

European Summons to Attend Oral Proceedings pursuant to Rule 115(1) EPC dated Apr. 18, 2008, from the corresponding European Application.

* cited by examiner

|  | TTI 1 | TTI 2 | TTI 3 | TTI 4 | TTI 5 | TTI 6 | TTI 7 | TTI 8 | TTI 9 |
|---|---|---|---|---|---|---|---|---|---|
| Node B 1 Channel Code 1 | UE50 Packet 1 | UE1 Packet 1 | UE3 Packet 1 | UE23 Packet 1 | UE4 Packet 2 | UE6 Packet 1 | UE1 Packet 1 | UE23 Packet 1 | UE7 Packet 1 |
| Node B 1 Channel Code 2 | UE50 Packet 2 | UE50 Packet 3 | UE4 Packet 1 | UE1 Packet 2 | UE7 Packet 1 | UE50 Packet 2 | UE4 Packet 1 | UE1 Packet 2 | UE17 Packet 1 |
| Node B 1 Channel Code 3 | UE11 Packet 1 | UE50 Packet 4 | UE1 Packet 1 | UE4 Packet 2 | UE23 Packet 2 | UE2 Packet 8 | UE11 Packet 4 | UE15 Packet 1 | UE23 Packet 2 |
| Node B 1 Channel Code 4 | UE11 Packet 2 | UE50 Packet 5 | UE50 Packet 10 | UE11 Packet 8 | UE16 Packet 2 | UE9 Packet 2 | UE40 Packet 2 | UE34 Packet 1 | UE9 Packet 3 |
| Node B 1 Channel Code 5 | UE11 Packet 3 | UE2 Packet 5 | UE16 Packet 1 | UE9 Packet 1 | UE11 Packet 3 | UE24 Packet 2 | UE43 Packet 2 | UE16 Packet 1 | UE11 Packet 10 |
| Node B 1 Channel Code 6 | UE11 Packet 4 | UE11 Packet 5 | UE2 Packet 6 | UE1 Packet 3 | UE4 Packet 1 | UE11 Packet 9 | UE40 Packet 3 | UE11 Packet 5 | UE4 Packet 1 |
| Node B 1 Channel Code 7 | UE2 Packet 1 | UE50 Packet 6 | UE50 Packet 11 | UE3 Packet 2 | UE24 Packet 1 | UE2 Packet 8 | UE38 Packet 1 | UE38 Packet 5 | UE50 Packet 14 |
| Node B 1 Channel Code 8 | UE2 Packet 2 | UE50 Packet 7 | UE50 Packet 12 | UE11 Packet 9 | UE43 Packet 1 | UE4 Packet 3 | UE38 Packet 2 | UE3 Packet 2 | UE14 Packet 1 |
| Node B 1 Channel Code 9 | UE2 Packet 3 | UE50 Packet 8 | UE11 Packet 6 | UE40 Packet 1 | UE50 Packet 13 | UE3 Packet 1 | UE38 Packet 3 | UE40 Packet 1 | UE43 Packet 2 |
| Node B 1 Channel Code 10 | UE2 Packet 4 | UE50 Packet 9 | UE11 Packet 7 | UE50 Packet 13 | UE2 Packet 7 | UE43 Packet 2 | UE38 Packet 4 | UE50 Packet 14 | UE2 Packet 9 |

Fig. 2

| MCS Levels /CQI value | Transport Block Size | Number of Codes | Modulation | Reference power adjustment Δ |
|---|---|---|---|---|
| 0 | N/A | Out of range | | |
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 931 | 2 | QPSK | 0 |
| 10 | 1262 | 3 | QPSK | 0 |
| 11 | 1483 | 3 | QPSK | 0 |
| 12 | 1742 | 3 | QPSK | 0 |
| 13 | 2279 | 4 | QPSK | 0 |
| 14 | 2583 | 4 | QPSK | 0 |
| 15 | 3319 | 5 | QPSK | 0 |
| 16 | 3565 | 5 | 16-QAM | 0 |
| 17 | 4189 | 5 | 16-QAM | 0 |
| 18 | 4664 | 5 | 16-QAM | 0 |
| 19 | 5287 | 5 | 16-QAM | 0 |
| 20 | 5887 | 5 | 16-QAM | 0 |
| 21 | 6554 | 5 | 16-QAM | 0 |
| 22 | 7168 | 5 | 16-QAM | 0 |
| 23 | 7168 | 5 | 16-QAM | -1 |
| 24 | 7168 | 5 | 16-QAM | -2 |
| 25 | 7168 | 5 | 16-QAM | -3 |
| 26 | 7168 | 5 | 16-QAM | -4 |
| 27 | 7168 | 5 | 16-QAM | -5 |
| 28 | 7168 | 5 | 16-QAM | -6 |
| 29 | 7168 | 5 | 16-QAM | -7 |
| 30 | 7168 | 5 | 16-QAM | -8 |

Fig.5

ADAPTIVE MODULATION AND CODING

BACKGROUND OF THE INVENTION

1. Field of the Invention

The present invention relates to adaptive modulation and coding methods and apparatus for use, for example, in wireless communication systems.

2. Description of the Related Art

FIG. 1 shows parts of a wireless communication system 1. The system includes a plurality of base stations 2, only one of which is shown in FIG. 1. The base station 2 serves a cell in which a plurality of individual users may be located. Each user has an individual user equipment (UE). Only the user equipments UE2, UE11 and UE50 are shown in FIG. 1. Each UE is, for example, a portable terminal (handset) or portable computer.

As is well known, in a code-division multiple access (CDMA) system the signals transmitted to different UEs from the base station (also known as "node B") are distinguished by using different channelisation codes. In so-called third generation wireless communication systems a high speed downlink packet access (HSDPA) technique has been proposed for transmitting data in the downlink direction (from the base station to the UEs). In this technique a plurality of channels are available for transmitting the data. These channels have different channelisation codes. For example, there may be ten different channels C1 to C10 available for HSDPA in a given cell or sector of a cell. In HSDPA, downlink transmissions are divided up into a series of transmission time intervals (TTI) or frames, and a packet of data is transmitted on each different available channel to a selected UE. A new choice of which UE is served by which channel can be made in each TTI.

FIG. 2 shows an example of the operation of the HSDPA technique over a series of transmission time intervals TTI1 to TTI9. As shown in FIG. 2, in TTI1 it is determined that two packets will be sent to UE50, four packets will be sent to UE11 and four packets will be sent to UE2. Accordingly, two channels are allocated to UE50 and four channels each are allocated to UE11 and UE2. Thus, as shown in FIG. 1, UE50 is allocated channels C1 and C2, UE11 is allocated channels C3 to C6, and UE2 is allocated channels C7 to C10.

In the next transmission time interval TTI2 a new user equipment UE1 is sent one packet, and the remaining UEs specified in TTI1 continue to receive packets.

Thus, effectively the HSDPA system employs a number of parallel shared channels to transmit data in packet form from the base station to the different UEs. This system is expected to be used, for example, to support world wide web (WWW) browsing.

In the HSDPA system, channel state information (CSI) is made available to both the transmitter and the receiver, in order to realise a robust communication system structure. The HSDPA system is intended to increase the transmission rates and throughput, and to enhance the quality of service (QoS) experienced by different users. It transfers most of the functions from the base station controller (also known as the radio network controller or RNC) to the base transceiver station (node B).

The HSDPA system may also use a control technique referred to as an adaptive modulation and coding scheme (AMC) to enable the base station to select different modulation and/or coding schemes under different channel conditions.

The signal transmission quality for a channel between the transmitter and a receiver (UE) varies significantly over time. FIG. 3 shows an example of the variation of a signal-to-interference ratio (SIR) a downlink channel for four different users over a series of 5000 TTIs. This plot was obtained by a simulation. As illustrated, for a given UE the range of SIR values may be as much as from around +12 dB to −15 dB. The SIR value varies due to shadowing, Rayleigh fading, and change in distribution of the mobile UEs, as well as cellular area specifications including the propagation parameters and speeds of UEs.

FIG. 4 is a graph illustrating a relationship between a data transmission rate (throughput) and signal-to-interference ratio for four different modulation and coding combinations, also referred to as modulation-and-coding scheme (MCS) levels. The first three levels (MCS8, MCS6 and MCS5) are all quadrature amplitude modulation (QAM) schemes which differ from one another in the number (64 or 16) of constellation points used. The fourth level (MCS1) uses quadrature phase shift keying (QPSK) as its modulation scheme.

Each level uses coding defined by a coding parameter which, in this example, is expressed as a redundancy rate R. For the first two levels MCS8 and MCS6 the redundancy rate R is 3/4, and for the third and fourth levels MCS5 and MCS1 the redundancy rate is 1/2.

As can be seen from FIG. 4, for SIR values lower than around −4 dB MCS1 (QPSK, R=1/2) is the best available option. The characteristic of this level is plotted with circles in the figure.

For SIR values in the range from around −4 dB to around +2 dB, MCS5 (16QAM, R=1/2) provides the best transmission rate. The characteristic for this MCS level is illustrated by crosses in the figure.

For SIR values between around +2 dB and +8 dB MCS6 (16QAM, R=3/4) provides the best transmission rate. The characteristic for this MCS level is illustrated by diamond points in the figure.

Finally, for SIR values greater than around +8 dB, MCS8 (64 QAM, R=3/4) provides the best transmission rate. The characteristic of this combination is illustrated by square points in the figure.

In the HSDPA system a technique such as adaptive modulation and coding (AMC) is used to adapt the MCS level in accordance with the variations of the channel condition (e.g. SIR value).

According to the HSDPA standard (3GPP TS 25.214 V5.5.0 (2003-6)), each UE holds a channel quality indicator (CQI) mapping table. An example of the mapping table is shown in FIG. 5. As the table shows, for each CQI value various parameters are defined including a transport block size, a number of codes, a modulation type, and a reference power adjustment $\Delta$. The transport block size represents a maximum number of bits which can be received in one TTI. The number of codes is the number of channelisation codes which are sent simultaneously to a single user within one TTI. The modulation type represents the type of modulation scheme, eg QPSK or 16QAM. The reference power adjustment $\Delta$ is a reduction to be applied to the transmitted power if the transmitted power is greater than that necessary for the signal to be receivable at the CQI value.

Each UE produces a measure of the quality of a downlink channel from the base station to the UE. Based on this measure and on the CQI mapping table the UE reports the highest CQI value for which a signal having the transport block size, number of codes and modulation for that value is receivable with a transport block error probability (also referred to as a Packet Error Rate (PER)) below a certain target value.

There may be a one-to-one correspondence between the CQI values and MCS levels, so that if desired the base station may directly take the reported CQI value as the MCS level to apply. For example, in one proposal (3GPP TSGR1-02-0459, "HSDPA CQI proposal", 9-12 Apr. 2002, Paris, France), there are CQI values 1 to 30 which are intended to provide approximately a 1 dB step size between adjacent MCS levels at 10% PER. Alternatively, the base station may employ the reported CQI value for each UE, as well as information relating to the system limitations and available MCS levels, to identify the most efficient MCS level for the particular UE.

Thus, based on the reported CQI values, UEs that have better channels or are located in the vicinity of the base station can employ higher levels of MCS and therefore enjoy higher transmission rates. Effectively, the result is a classification of the transmission rates based on the channel quality of each UE.

Ideally, each UE reports a CQI value in every TTI and the base station is capable of setting a new MCS level for each available channel in every TTI.

The HSDPA system may also employ a hybrid automatic repeat request (H-ARQ) technique.

FIG. 6 is a schematic diagram for use in explaining how the H-ARQ technique works. In this example, the technique is a so-called stop-and-wait (SAW) version of the technique. The figure shows packet transmissions in a single downlink channel HSPDSCH1 over a series of successive TTIs, TTI1 to TTI9. In TTI2 a first packet is transmitted to UE1. Upon receiving a packet, each UE checks whether the transmission was error-free. If so, the UE sends an acknowledge message ACK back to the base station using an uplink control channel such as the dedicated physical control channel (DPCCH). If there was an error in the transmission of the received packet, the UE sends a non-acknowledge message NACK back to the base station using the uplink channel.

In the example shown in FIG. 6, the first packet transmitted to UE1 in TTI2 fails to be received error-free, and accordingly some time later, in TTI4, UE1 sends the NACK message to the base station. In the H-ARQ technique it is permitted for the next packet destined for a particular UE to be transmitted without waiting for the acknowledge or non-acknowledge message of a packet previously transmitted to the same UE. Thus, none of the transmission timeslots can go idle in the case of error-free channels, which gives the ability to schedule UEs freely. System capacity is saved while the overall performance of the system in terms of delivered data is improved.

For example, as shown in FIG. 6, before the NACK message for the first packet of UE1 is received by the base station, the base station transmits a second packet to UE1 in TTI4. Thus, this second packet for UE1 is transmitted before the first packet for UE1 is retransmitted in TTI7 in response to the NACK message for the first transmission of the first packet.

In the H-ARQ technique, an erroneously-received packet (failed packet) is subject to a so-called chase combining process. In this process a failed packet is resent by the transmitter and subsequently the receiver "soft" combines (for example using maximal ratio combining) all received copies of the same packet. The final SIR is determined as the sum of the respective SIRs of the two packets being combined. Thus, the chase combining process improves the SIR of the transmitted packets.

Further information regarding AMC and HARQ techniques may be found in 3GPP TR 25.848 V 4.0.0 (2001-03), Third Generation Partnership Project; Technical Specification Group Radio Access Network; Physical Layer Aspects of UTRA High Speed Downlink Packet Access (release 4), March 2001, the entire content of which is incorporated herein by reference.

The switching between different MCS levels has been recognised as a very critical task, and recently there have been various proposals for optimising this switching. For example, in TSG R1-1-0589, TSG-RAN Working Group 1 meeting no. 20, Busan, Korea, May 21 to 25, 2001, NEC and Telecom MODUS jointly proposed an AMC technique in which the thresholds for switching between different MCS levels are adjusted based on the ACK/NACK signalling from the UE. If NACK is signalled, the base station increases the thresholds by an upward amount S1. If ACK is signalled, the base station decreases the thresholds by a downward amount S2. The adjustments to the thresholds are limited and, for simplicity, the differences between thresholds may be fixed. The ratio between the upward amount S1 and the downward amount S2 may be determined based on the target error rate.

This AMC method adjusts the thresholds between MCS levels to try to take into account different operating conditions in the wireless communication system. In particular, the optimum MCS levels under any particular signal conditions depend on the Doppler frequency (i.e. the speed at which the UE is moving) and the multi-path propagation conditions. For example, FIG. 7 shows the effect of the UE speed on the throughput-vs.-SIR characteristic for each of the different MCS levels in FIG. 4. Three lines are plotted per MCS level: the highest line corresponds to a low UE speed of 3 km/h (Doppler frequency Fd=5.555 Hz), the middle line corresponds to a medium UE speed of 60 km/h (Fd=111.112 Hz), and the lowest line corresponds to a high UE speed of 120 km/h (Fd=222.24 Hz). FIG. 7 shows that throughput declines as UE speed increases. It can also be seen that the optimum thresholds for switching between MCS levels are also changed as the UE speed changes.

FIG. 7 relates to a single-path Rayleigh fading mode. FIG. 8 shows the effect of different UE speeds under path conditions of two equal-gain paths. It can be seen that the characteristics are very different from FIG. 6, and it is clear that the optimum thresholds are changed as the path conditions change.

The method proposed by NEC/Telecom MODUS changes the thresholds as the operating conditions change but the method does not provide a satisfactory solution as it increases or decreases the threshold each time an ACK or NACK message is received, i.e. every frame. When the step size between thresholds for switching MCS levels is significant (eg a few dB) this appears to result in relatively poor performance at lower MCS levels for path conditions in which there is effectively a single dominant path, for example in open countryside.

In another AMC method proposed by NEC and Telecom MODUS in TSG R1-1-0589 the base station selects a MCS level based on the ACK/NACK signalling from the UE. For example, the base station lowers the MCS level if NACK is received, and increases the MCS level if ACK is received successively for a certain number of TTIs. This method has the advantage that it does not rely on results of measuring the channel quality to select the MCS levels. Thus, problems of measurement accuracy and reporting delay are avoided. However, this method appears to have relatively poor performance at high SIR values when there are two paths of comparable strength, for example in an urban environment.

SUMMARY OF THE INVENTION

According to a first aspect of the present invention there is provided an adaptive modulation and coding method. The method comprises holding one or more adjustable values, each corresponding to at least one of a plurality of available modulation and coding levels applicable to a signal transmitted from a transmitter to a receiver, and each representing a change to the or each level to which it corresponds. One or more of the adjustable values is/are adjusted in dependence upon whether or not the signal is received successfully by the receiver. One of the available modulation and coding levels is selected to apply to the signal based on such an adjustable value.

Such an adaptive modulation and coding method can enable the appropriate modulation and coding level to be selected even when the path and channel conditions vary.

In one preferred embodiment, the holding, adjusting and selecting steps are carried out by the transmitter. Alternatively, however, the holding, adjusting, and selecting steps may be carried out by the receiver, with the receiver informing the transmitter of the selected modulation and coding level.

When the adjusting step is carried out in the transmitter, the receiver may transmit to the transmitter an indication of whether or not the signal was received successfully. The indication may be, for example, an ACK/NACK signal. The transmitter then adjusts one or more of the adjustable values in dependence upon the received indication.

In one embodiment, the adjustable values are held in a table which stores adjustable values corresponding respectively to all of the plurality of available modulation and coding levels. The table may be "seeded" by simply making each adjustable value equal to its corresponding one of the available modulation and coding levels. Thereafter, the adjustable values may be adjusted in dependence upon whether or not the signal is received successfully by the receiver.

With such a table, it is possible for each one of the adjustable values to be adjusted by a different amount, if desired, in the adjusting step. Alternatively, it is possible to adjust only some of the adjustable values in the adjusting step whilst leaving other values unchanged. Also, because all the adjustable values are held in the table, retrieval and updating of the values can be quick and efficient. For example, in a preferred embodiment, the receiver proposes one of the available modulation and coding levels based on a signal transmission quality, and the final modulation and coding level is selected based on the adjustable value corresponding to the proposed modulation and coding level. In this case, the proposed modulation and coding level can be used as an index to the table to simplify the selection of the corresponding adjustable value.

It is not necessary to use a table to hold the adjustable values. In another embodiment, one or more shared adjustable values are held. The or each adjustable value may correspond to more than one of the plurality of available modulation and coding levels. For example, one group of available modulation and coding levels sharing the same basic modulation type (e.g. QPSK) may have the same corresponding adjustable value, whereas another such group (e.g. levels having another modulation type such as 16QAM) may have another corresponding adjustable value. In this case, the or each adjustable value may be an offset value, with the final modulation and coding level being selected by applying the offset value to the modulation and coding level proposed by the receiver. The or each adjustable value may be set to 0 in an initialisation step, and thereafter be subject to adjustment in dependence upon whether or not the signal is received successfully by the receiver.

If the transmitter and receiver operate repetitively, for example on a time slot by time slot or frame by frame basis, then the adjusting and selection steps may be carried out per time slot or per frame. In this way, based on whether or not the signal was received successfully by the receiver in one time slot or frame, the adjustable values may be adjusted and a new modulation and coding level selected to apply to the signal transmitted in the next time slot or frame.

In one embodiment, the adjusting step comprises increasing one or more of the adjustable values when the signal is received successfully and decreasing one or more of the adjustable values when the signal is not received successfully.

In the adjusting step, at least one of the adjustable values may be increased by an amount different from an amount by which another one of the corresponding adjustable values is adjusted. This can be useful if, for example, the modulation and coding levels comprise two or more groups of levels such as one group of levels for QPSK modulation and another group of levels for 16QAM modulation. In this case, the adjustment amounts applied to one group may be made different from those applied to the other group.

Preferably, the or each adjustable value is a non-integer value. In the selecting step, a rounded version of the adjustable value may be employed to select the modulation and coding level to apply to the signal, the rounded version representing the nearest integer value to the non-integer adjustable value. In this way, although it is of course necessary to produce an integer value for the final selected modulation and coding level, the adjustable values can be maintained with a higher precision so that the most appropriate modulation and coding level is selected based on the prevailing path and channel conditions.

The receiver may produce a measure of signal transmission quality, for example a signal-to-interference and noise ratio. A fixed mapping may then be employed, either in the receiver or in the transmitter, to map this measure to a proposed modulation and coding level. For example, in one embodiment, the receiver produces a CQI value which it reports to the transmitter. This CQI value may have a one-to-one correspondence with the available MCS levels. In this case, the reported CQI value is used by the transmitter to select the adjustable value, and the selected adjustable value is then used to derive the final modulation and coding level.

The method may be used in a wireless communication system, in which case the transmitter may be a base station and the receiver may be a user equipment of the wireless communication system. The signal transmitted from the base station to the user equipment may be a downlink packet access signal. Alternatively, the transmitter may be a user equipment and the receiver may be a base station, and the signal transmitted from the user equipment to the base station may be an uplink packet access signal.

According to a second aspect of the present invention there is provided adaptive modulation and coding apparatus. The apparatus comprises an adjustable value holding unit which holds one or more adjustable values, each corresponding to at least one of a plurality of available modulation and coding levels applicable to a signal transmitted from a transmitter to a receiver, and each representing a change to the or each level to which it corresponds. The apparatus also comprises an adjusting unit which adjusts one or more of the adjustable values in dependence upon whether or not the signal is received successfully by the receiver. A selecting unit selects one of the available modulation and coding levels to apply to the signal based on such an adjustable value.

According to a third aspect of the invention there is provided a transmitter for use in a wireless communication system. The transmitter comprises an adjustable value holding unit which holds one or more adjustable values, each corresponding to at least one of a plurality of available modulation and coding levels applicable to a signal transmitted from the transmitter to a receiver of said system, and each representing a change to the or each level to which it corresponds. An adjusting unit adjusts one or more of the adjustable values in dependence upon whether or not the signal is received successfully by the receiver. A selecting unit selects one of the available modulation and coding levels to apply to the signal based on such an adjustable value.

The transmitter may be part of a base station or part of a user equipment of a wireless communication system.

According to a fourth aspect of the present invention there is provided a receiver for use in a wireless communication system. The receiver comprises an adjustable value holding unit which holds one or more adjustable values, each corresponding to at least one of a plurality of available modulation and coding levels applicable to a signal transmitted from a transmitter of the system to the receiver, and each representing a change to the or each level to which it corresponds. An adjusting unit adjusts one or more of the adjustable values in dependence upon whether or not the signal is received successfully by the receiver. A selecting unit selects one of the available modulation and coding levels based on such an adjustable value. A level informing unit transmits to the transmitter information specifying the selected modulation and coding level.

The receiver may be part of a base station or part of a user equipment of a wireless communication system.

According to a fifth aspect of the present invention there is provided an operating program which, when run on a processor in a transmitter of a wireless communication system, causes the transmitter to carry out the steps of: holding one or more adjustable values, each corresponding to at least one of a plurality of available modulation and coding levels applicable to a signal transmitted from the transmitter to a receiver of the system, and each representing a change to the or each level to which it corresponds; adjusting one or more of the adjustable values in dependence upon whether or not the signal is received successfully by the receiver; and selecting one of the available modulation and coding levels to apply to the signal based on such an adjustable value.

According to a sixth aspect of the present invention there is provided an operating program which, when run on a processor in a receiver of a wireless communication system, causes the receiver to carry out the steps of: holding one or more adjustable values, each corresponding to at least one of a plurality of available modulation and coding levels applicable to a signal transmitted from a transmitter of the system to the receiver, and each representing a change to the or each level to which it corresponds; adjusting one or more of the adjustable values in dependence upon whether or not the signal is received successfully by the receiver; selecting one of the available modulation and coding levels based on such an adjustable value; and transmitting to the transmitter information specifying the selected modulation and coding level.

In the fifth and sixth aspects of the invention, one of the transmitter and the receiver may be part of a base station of a wireless communication system, and the other of the transmitter and the receiver may be part of a user equipment of the system.

An operating program embodying the fifth or sixth aspect of the present invention may be provided by itself or may be carried by a carrier. The carrier may be a recording medium such as a disk or CD-ROM or may be a transmission medium such as a signal. The appended claims are to be interpreted accordingly.

BRIEF DESCRIPTION OF THE DRAWINGS

FIG. 2, also discussed hereinbefore, shows an example of the operation of the HSDPA technique in the FIG. 1 system;

FIG. 5, also discussed hereinbefore, shows an example of a CQI mapping table;

DETAILED DESCRIPTION OF THE PREFERRED EMBODIMENTS

Figure 9:
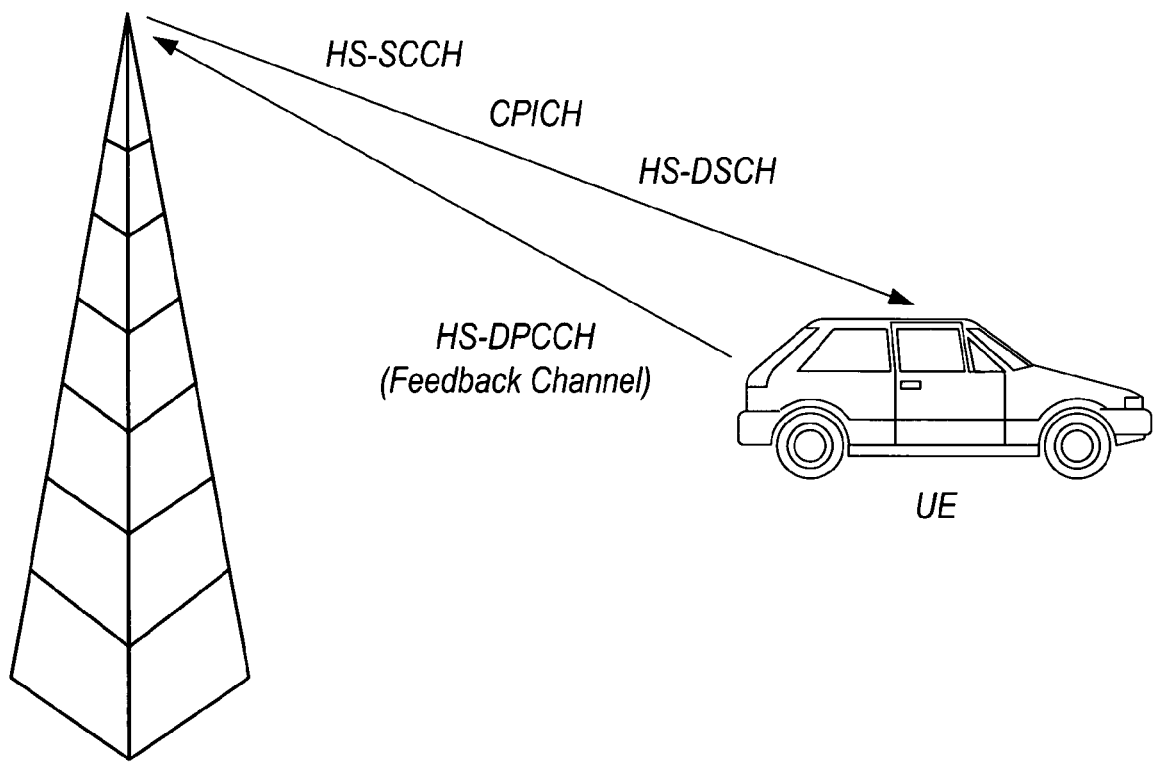
FIG. 9 is a schematic view of parts of a wireless communication system for explaining signalling used therein.

Before describing embodiments of the invention, reference is made to FIG. 9 which is a schematic view for explaining signalling in an HSDPA system.

For downlink signalling, three channels are used. A common pilot channel (CPICH) is used to broadcast a signal to all UEs in the cell served by the base station, in order to enable each UE to measure a downlink channel quality based on the CPICH signal. A high-speed downlink shared channel HS-DSCH is used to transmit packet data to a UE. A high-speed shared control channel HS-SCCH is used to carry transport format and resource related information (TFIR). This TFIR is, for example, 8 bits and includes information regarding a channelisation code, a MCS level, and a transport block size. The HS-SCCH also carries HARQ related information. This HARQ information is, for example, 12 bits and includes a HARQ process number, a redundancy version, a new data indicator, and a UE ID.

Uplink signalling is carried out using a high-speed dedicated physical control channel (feedback channel) HS-DPCCH. This channel is used to transmit a channel quality indicator (CQI) value and an HARQ acknowledgement (ACK/NACK).

An AMC method according to a first embodiment of the present invention will now be explained with reference to FIGS. 10 to 12. This embodiment is used to adapt the MCS level of a downlink packet access signal in an HSDPA system. Thus, in this embodiment the transmitter is part of the base station and the receiver is part of the user equipment.

In the first embodiment the base station maintains, for each UE in its cell, a table of so-called "soft" MCS values. An example of the soft MCS value table is shown in FIG. 10. The table 10 has an upper row 12 and a lower row 14. The table is also divided into a QPSK region 16 made up of the first 16 columns of the table, and a 16QAM region 18 made up of the remaining 7 columns of the table.

The upper row 12 of the table contains the set of available CQI values. These CQI values correspond to the values 0 to 22 described previously with reference to FIG. 5. In this embodiment, CQI values 23 to 30 are not available.

For each CQI value in the upper row 12, there is a corresponding adjustable MCS value in the lower row 14. For example, in FIG. 10 the soft MCS value 15.22 corresponds to the CQI value 16.

The soft MCS values in the lower row 14 are adjustable in use of the base station in dependence upon the channel conditions experienced by the UE, as will now be explained with reference to FIG. 11.

When a UE joins the cell served by the base station, in step S1 a table of soft MCS values is created at the base station for the joining UE. The soft MCS values in the lower row 14 are initially set equal respectively to the corresponding CQI values in the upper row 12. After the initialisation step S1 is completed, the AMC method according to the first embodiment operates on a frame-by-frame basis, and in each downlink frame (TTI of 2 ms) steps S2 to S8 are carried out. Incidentally, the 3 GPP specifications also refer to a subframe as a period of 3 time slots (2 ms). In this case, steps S2 to S8 can be carried out per sub-frame.

In step S2, the UE produces a measure of downlink channel quality for the latest frame. This measure is, for example, based on the CPICH and represents a ratio of a received power $\hat{I}_{or}$ of the CPICH signal to background noise including interference $I_{oc}$. The ratio $\hat{I}_{or}/I_{oc}$ is a signal-to-interference ratio.

Using an internal mapping table such as that described previously with reference to FIG. 5, the UE identifies the highest CQI value for which a single HS-DSCH sub-frame formatted with the transport block size, number of HS-PDSCH codes and modulation corresponding to the CQI value could be received with a transport block error probability not exceeding a target value. For example, the target transport block error probability may be 0.1.

Figure 1:
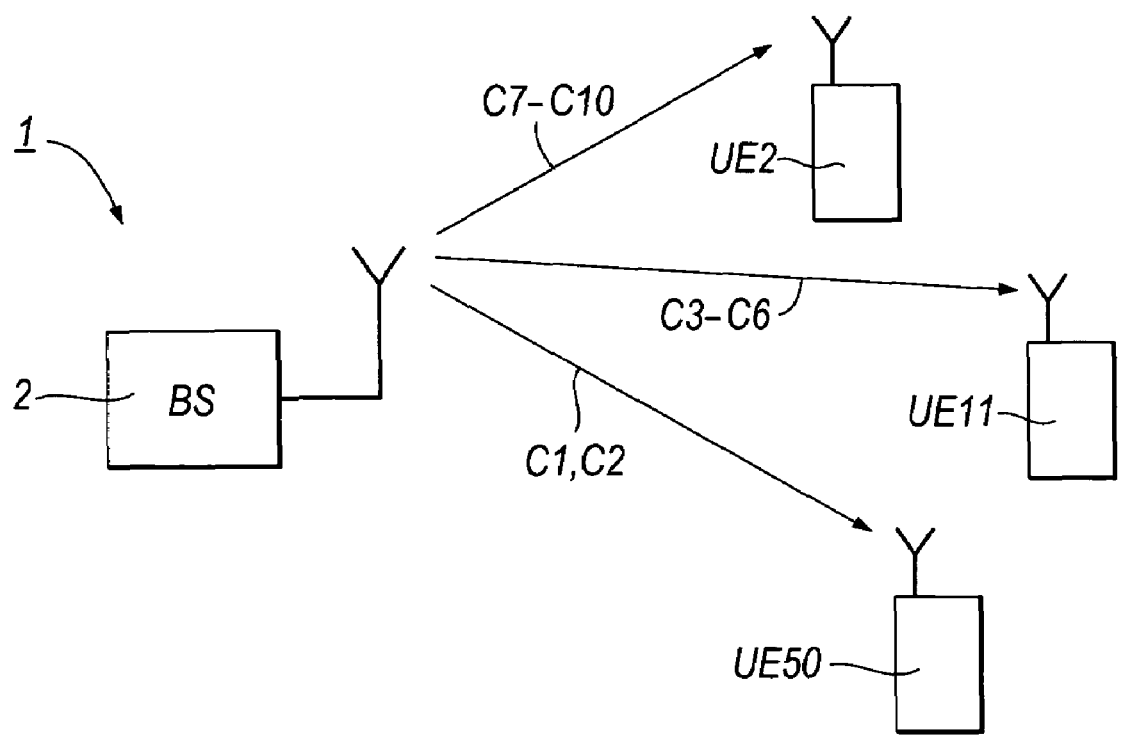
FIG. 1, discussed hereinbefore, shows parts of a wireless communication system employing a HSDPA technique for downlink transmissions.
Figure 3:
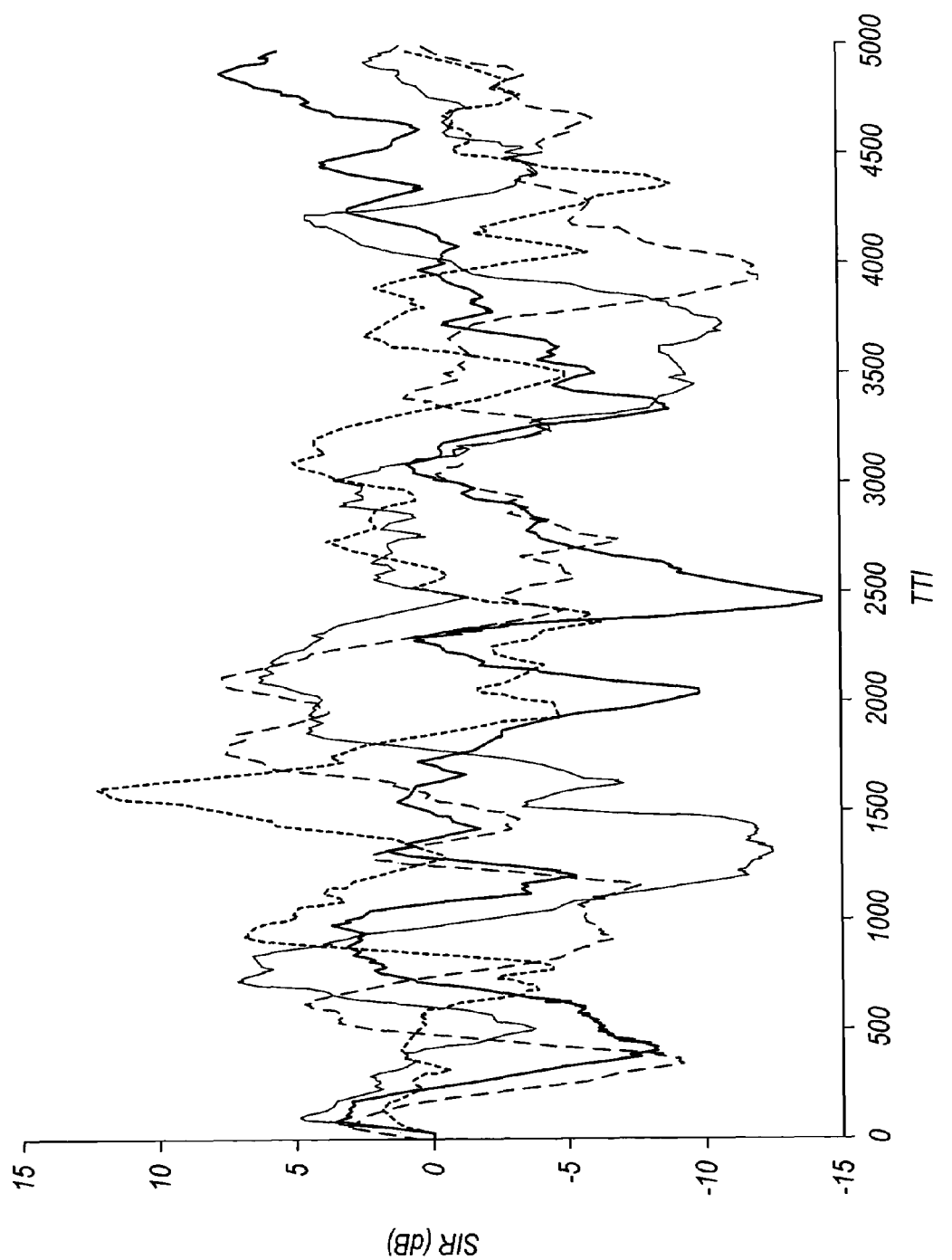
FIG. 3, also discussed hereinbefore, is a graph illustrating an example variation in signal-to-interference ratio of a downlink channel over a series of transmission time intervals for four different UEs in a wireless communication system.
Figure 4:
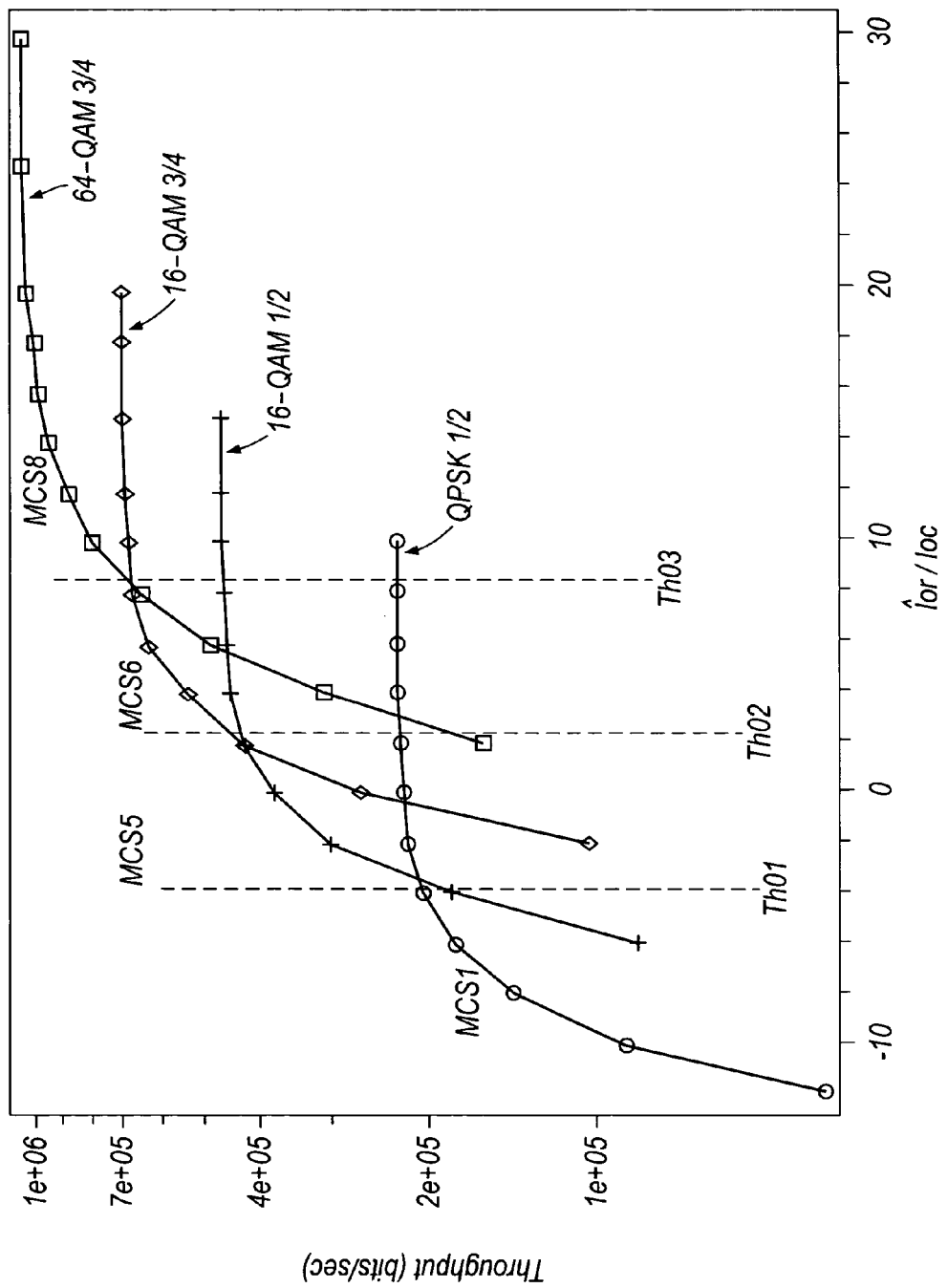
FIG. 4, also discussed hereinbefore, is a graph for use in explaining an adaptive modulation and coding technique.
Figure 6:
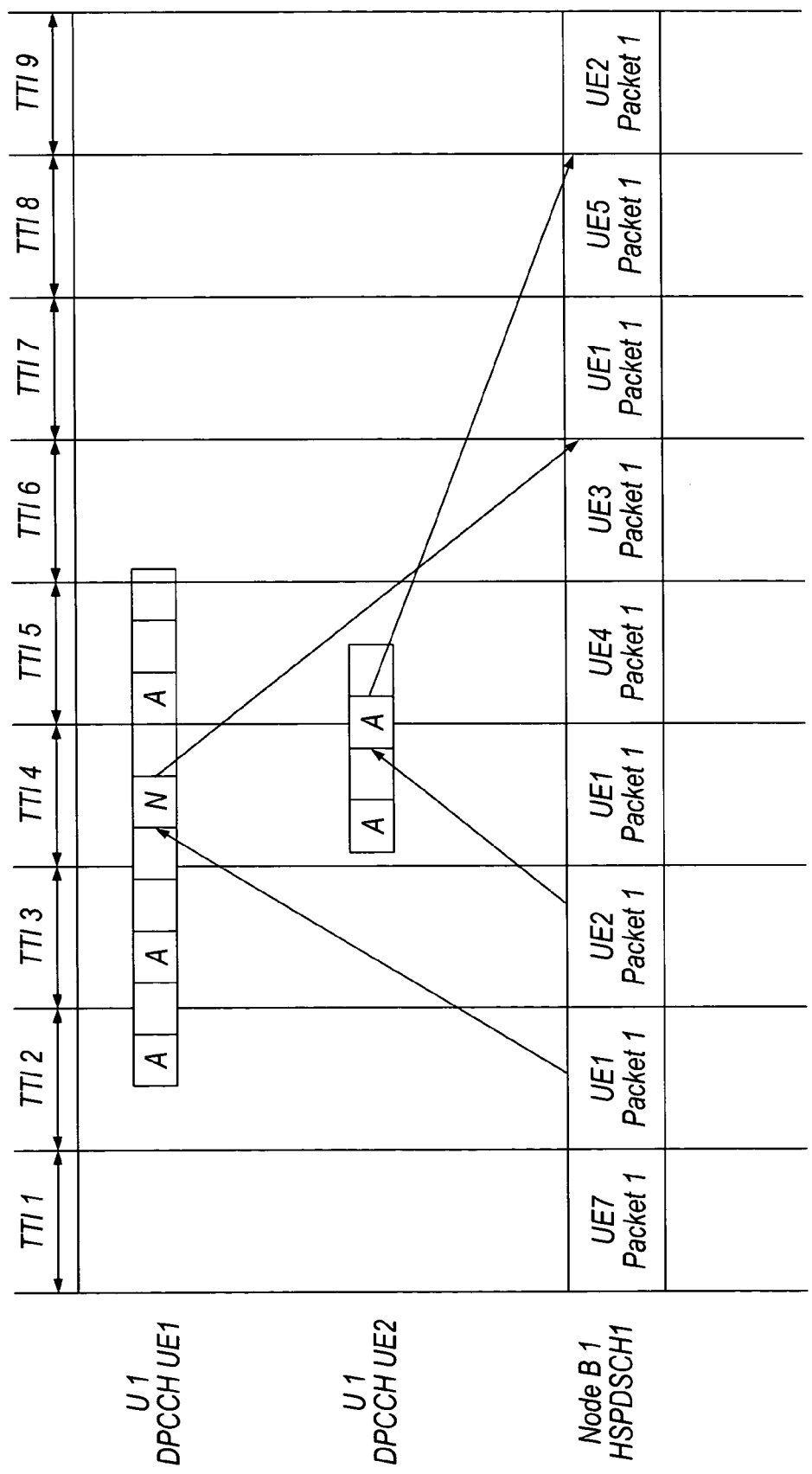
FIG. 6, also discussed hereinbefore, is a schematic diagram for use in explaining an automatic repeat request process.
Figure 7:
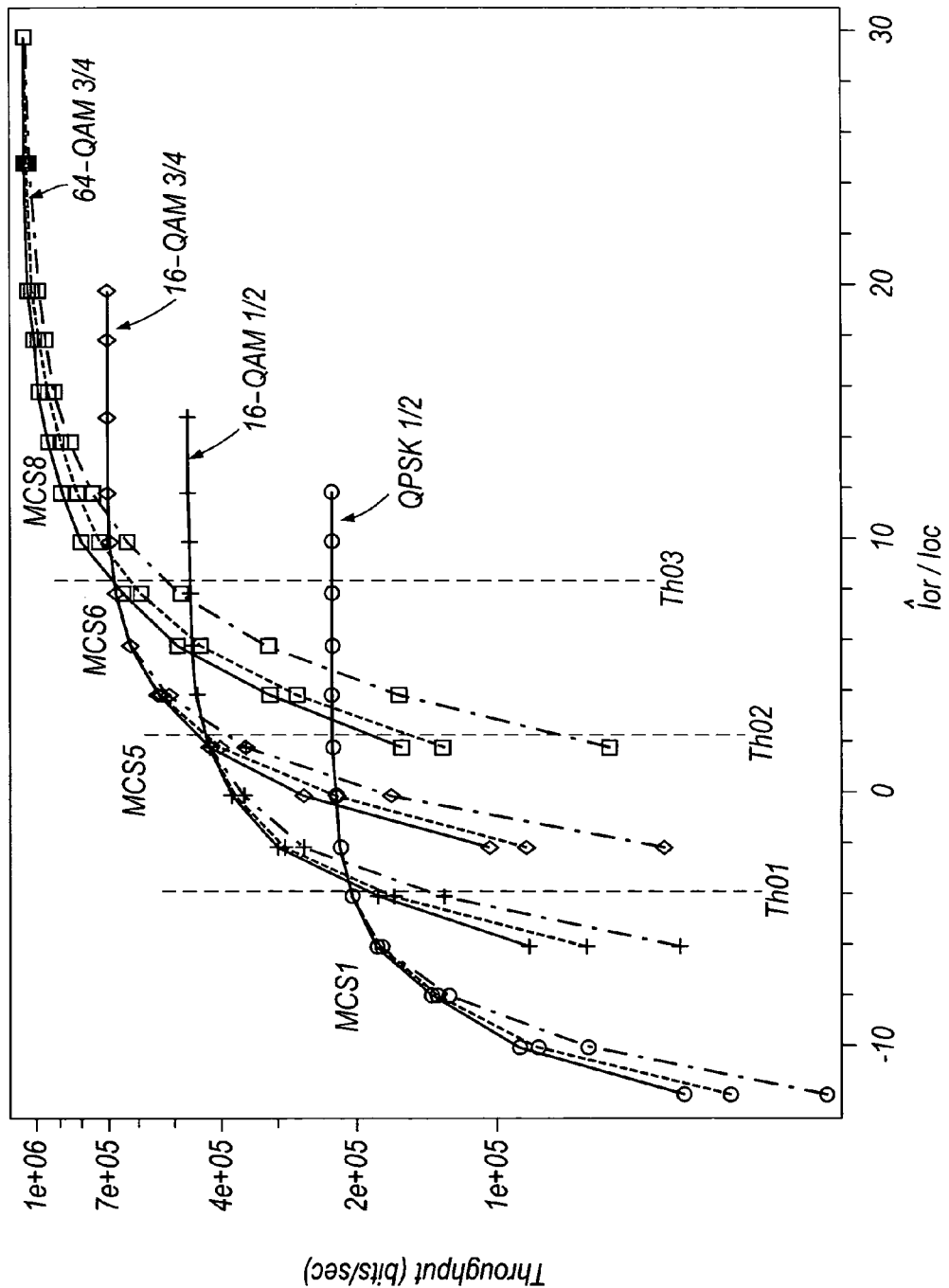
FIG. 7, also discussed hereinbefore, is a graph corresponding to FIG. 4 for illustrating how a UE speed affects operation of an adaptive modulation and coding technique.
Figure 8:
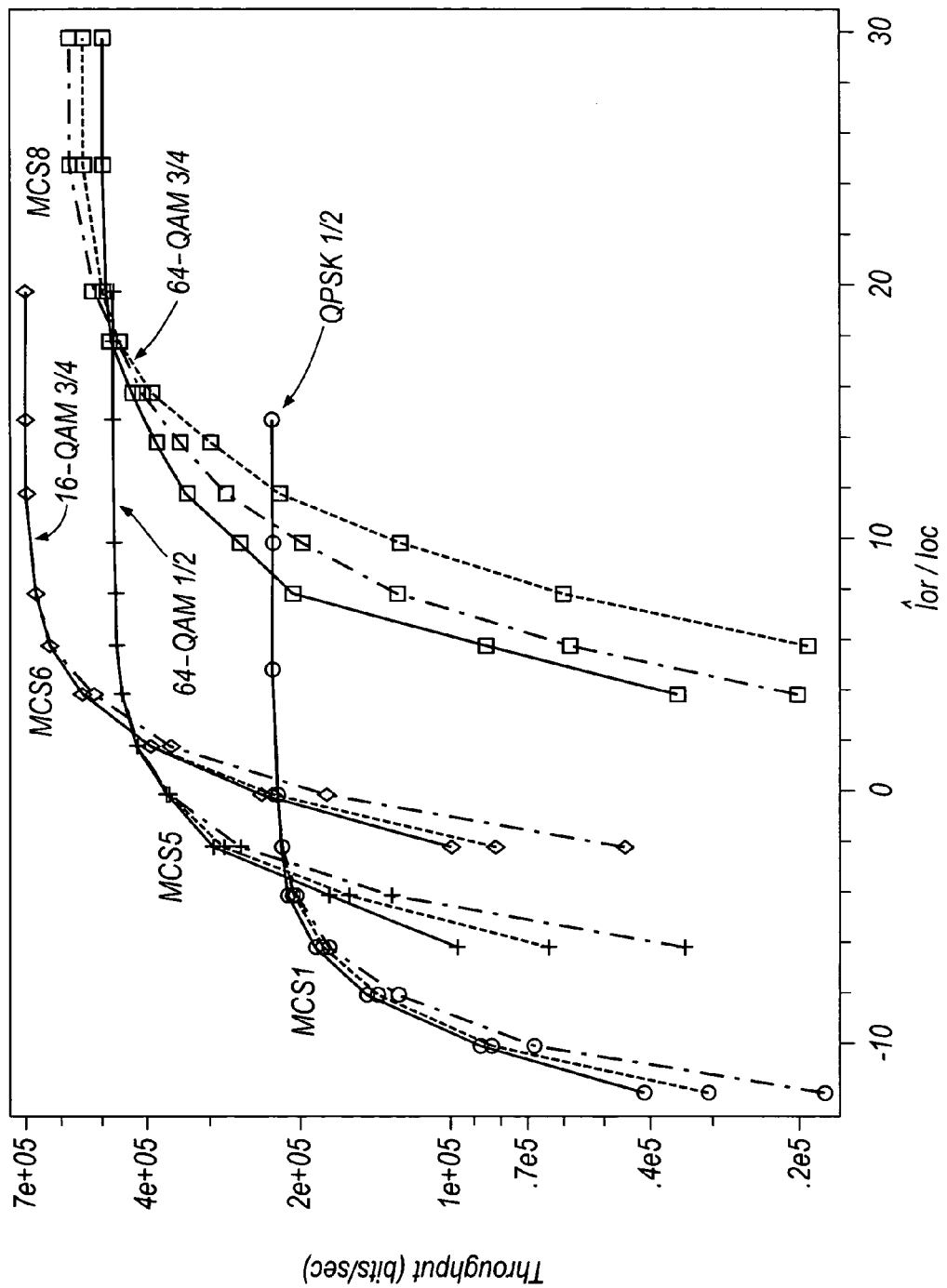
FIG. 8, also discussed hereinbefore, is another graph for illustrating how different path conditions affect the operation of an adaptive modulation and coding technique.

For example, to identify the highest CQI value the measure of downlink channel quality may be compared with a set of values held by the UE for CQI value determination. There is one such threshold value for each pair of adjacent CQI values. These threshold values correspond to the threshold values Th01, Th02 and Th03 described above with reference to FIG. 4. Based on the comparison, the highest available CQI value at which the transport block error probability target is achieved is identified.

Also in step S2 the UE carries out a cyclic redundancy check (CRC) on the latest frame of the HS-DSCH signal. The CRC result (pass or fail) is needed to generate the ACK/NACK message but, as described below, it is also used for another purpose in the present invention.

The CRC result and the CQI value are reported by the UE to the base station using the HS-DPCCH.

In step S3, it is determined whether the reported CRC result was a pass (ACK) or fail (NACK). If the CRC result is a pass, processing proceeds to step S4. In step S4, each of the soft MCS values in the QPSK region 16 of the table is increased by a first upward adjustment amount ΔUpQPSK. Similarly, each of the soft MCS values in the 16QAM region 18 of the table is increased by a second upward adjustment amount ΔUp16QAM. Processing then proceeds to step S6.

If, on the other hand, in step S3 the CRC result was a fail, then in step S5 each of the soft MCS values in the QPSK region 16 of the table is decreased by a first downward adjustment amount ΔDownQPSK and each of the soft MCS values in the 16QAM region 18 of the table is decreased by a second downward adjustment amount ΔDown16QAM. Processing then proceeds to step S6.

In step S6, the CQI value reported by the UE in step S2 is used as an index to the table 10 so as to identify the soft MCS value corresponding to the reported CQI value. For example, as shown in FIG. 10, the soft MCS value 15.22 corresponds to the CQI value 16. In step S6 this soft MCS value is selected and rounded to the nearest integer, which in this case is 15. This value is taken as the next MCS level to be applied.

In step S7 it is checked whether the next MCS level is within the permitted range of MCS levels. If the next MCS level chosen in step S6 is lower than the lowest permitted MCS level then the next MCS level is simply set to the lowest permitted MCS level. Similarly, if the next MCS level selected in step S6 is higher than the highest permitted MCS level then the next MCS level is set to the highest permitted MCS level.

Finally, in step S8 the next MCS level determined in steps S6 and S7 is applied to the downlink signal transmitted to the UE in the next subframe.

Figure 11:
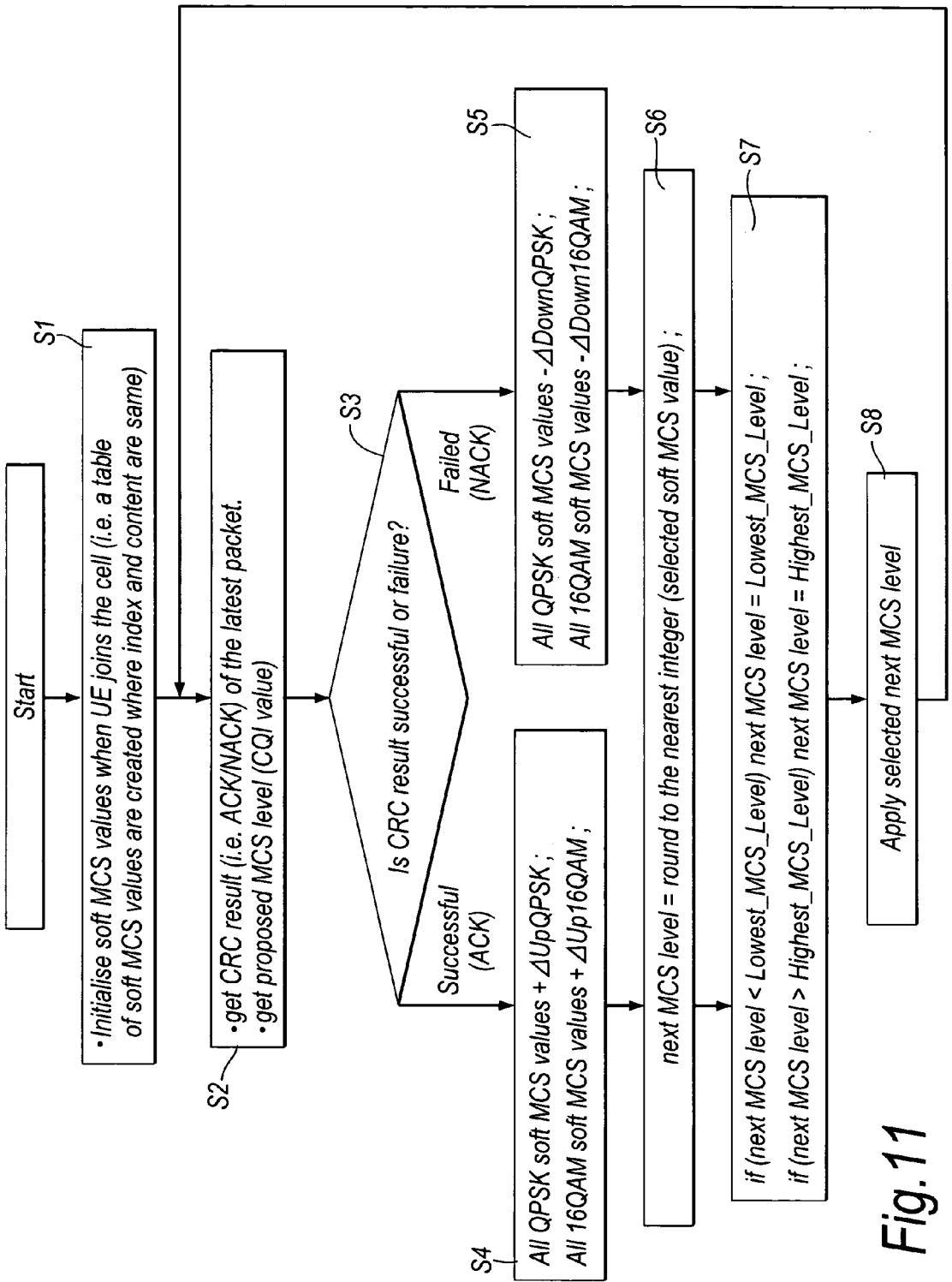
FIG. 11 is a flowchart for use in explaining an AMC method according to a first embodiment of the present invention.
Figure 12:
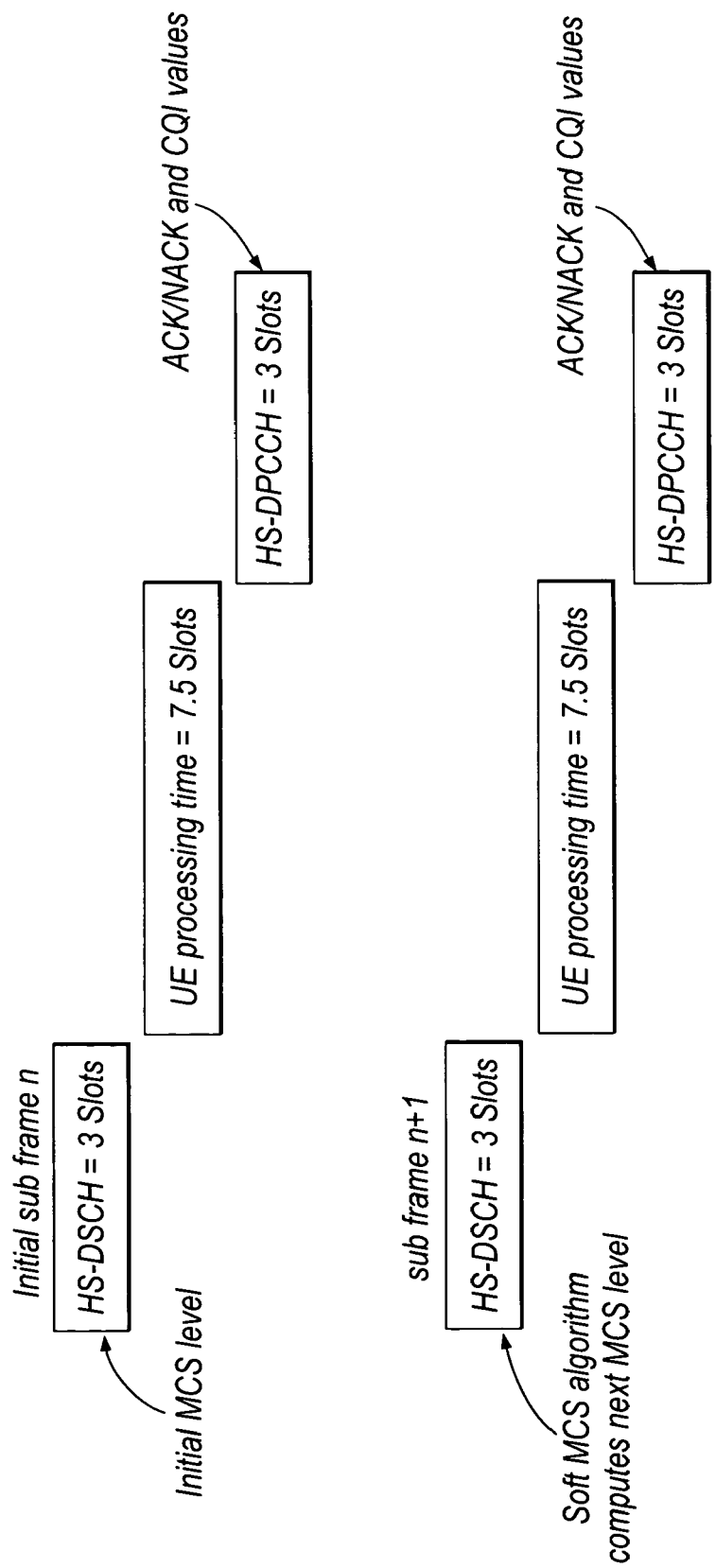
FIG. 12 is a timing diagram relating to the operation of the first embodiment.

FIG. 12 is a timing diagram for explaining the timing of the operations in FIG. 11. As shown in FIG. 12, in a first subframe n the UE receives data via the HS-DSCH using an initial or default MCS level. The UE then has a period of 7.5 time slots in which to process the data to produce the CRC result and the CQI value. Then, in an uplink subframe k, the CRC result (ACK/NACK) and the CQI value are reported to the base station via the HS-DPCCH.

The base station receives the reported ACK/NACK and CQI value for subframe n, and determines the next MCS level before the start of the next frame n+1. The base station then transmits the next data to the UE via the HS-DSCH in the next HS-DSCH subframe n+1 for that UE. As in the preceding frame, the UE has 7.5 time slots to process the received data to produce the CRC result and the CQI value. These are then reported back to the base station in the HS-DPCCH subframe k+1, and so on for subsequent subframes.

In steps S4 and S5, ΔUp16QAM may be set in dependence upon a target packet error rate PER (transport block error probability). For example, if the target PER is 0.1, $$\Delta Up16QAM = \frac{PER}{1-PER} = \frac{0.1}{0.9} = 0.11.$$

It was found empirically that suitable values for the other adjustment amounts are:

$\Delta Down16QAM = 3*\Delta Up16QAM = 0.33$ $\Delta UpQPSK = \Delta Up16QAM/10$ $\Delta DownQPSK = 3*\Delta UpQPSK$ Next, some simulation results will be described to show how the performance of an AMC method embodying the present invention compares with that of previously-proposed techniques. The first previously-proposed technique which will be considered is the adaptive threshold technique described in the introduction in which the thresholds for switching between different MCS levels are adjusted based on the ACK/NACK results (hereinafter "prior art technique (1)"). The second previously-proposed technique is the further technique described in the introduction in which the base station selects a MCS level based on the ACK/NACK signalling from the UE (hereinafter "prior art technique (2)").

The assumptions made in the simulations are set out in Table 1 below.

TABLE 1

| Parameters | Values |
|---|---|
| Propagation conditions | 1-Path Rayleigh/2-Path Rayleigh Fading |
| Vehicle Speed for Fading | 3,120 Kmph |
| CPICH power | 10% of Tx Power at NodeB |
| DSCH power | 80% of Tx Power at NodeB |
| HSDPA frame Length | 2 ms |
| Spreading factor (SF) | 16 |
| $\hat{I}_{or}/I_{oc}$ | Variable |
| MCS update | 1 frame (2 ms) |
| CPICH measurement delay | 1 frame |
| MCS selection delay | 1 frame |
| CPICH measurement error | Perfect Ch. Estimation |
| CPICH measurement report error rate | Perfect |
| Channel Estimation | Perfect Ch. Estimation |
| Fast fading model | Jakes spectrum |
| Channel coding | Turbo coding with 22 MCS levels |
| Tail bits | 6 |
| No. of iterations for Turbo Coder | 8 |
| Metric for Turbo Coder | Max |
| Input to Turbo Decoder | Soft |
| Number of Rake fingers | Equals number of Paths |
| Hybrid ARQ | None |
| Information Bit Rates (Kbps) | As shown in FIG. 5 |
| Number of Multicodes Simulated | As shown in FIG. 5 |
| STTD | Off |

Figure 13:
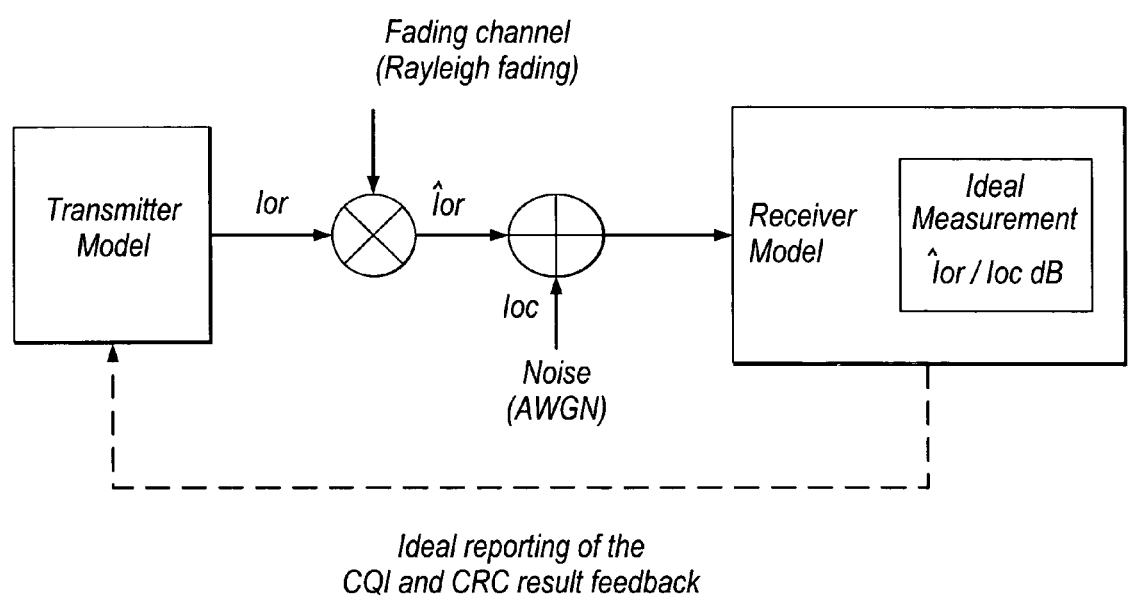
FIG. 13 is a schematic representation of a simulation model used for simulating performance of an embodiment of the present invention.

FIG. 13 is a schematic representation of the model used in the simulations. In particular, it is assumed that the fading is Rayleigh fading, the channel noise is Additive White Gaussian Noise (AWGN), the receiver measures the channel quality ($\hat{I}_{or}/I_{oc}$) perfectly, and the reporting of the CQI value and CRC result is error-free.

FIGS. 14 to 17 each show a throughput versus downlink channel quality characteristic for an AMC method embodying the present invention (solid line), the prior art technique (1) (dot-dash line) and the prior art technique (2) (dashed line).

Figure 14:
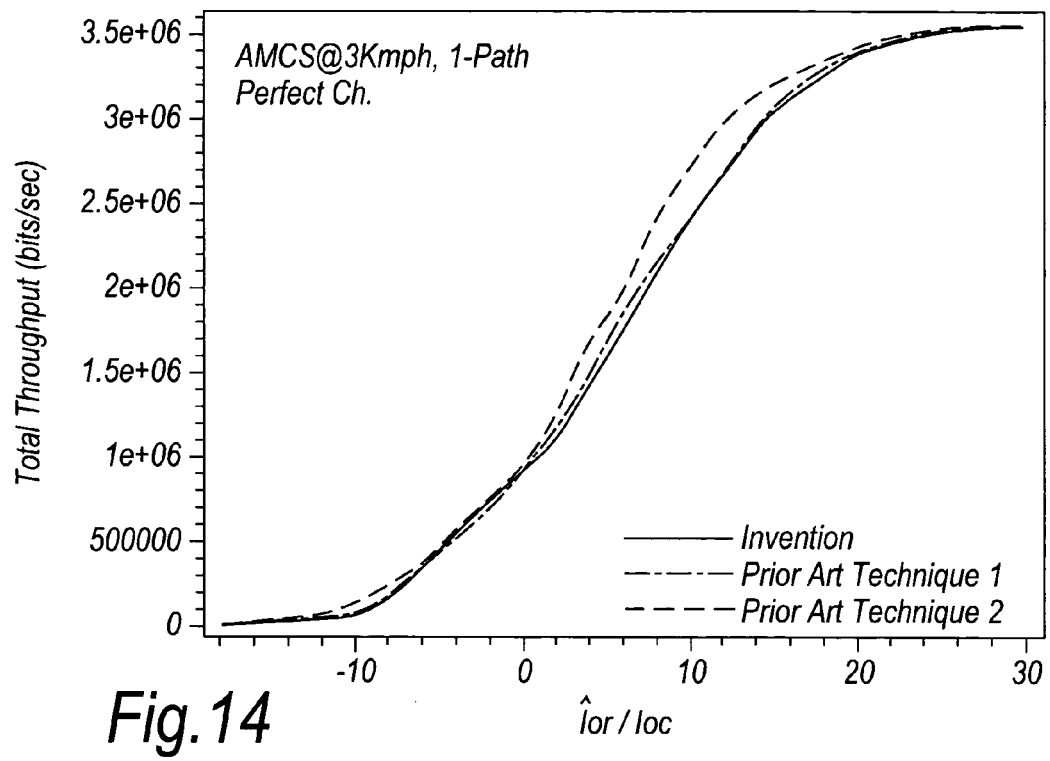
FIGS. 14 to 17 are graphs illustrating throughput versus channel quality characteristics for comparing operation of an AMC method embodying the present invention with conventional methods under different UE speed and path conditions.

FIG. 14 assumes that the UE is moving at a low speed of 3 kph. It is also assumed that the path conditions prevailing between the base station and the UE are such that there is a single dominant path. This kind of path condition arises, for example, in open countryside, as opposed to urban environments.

Figure 15:
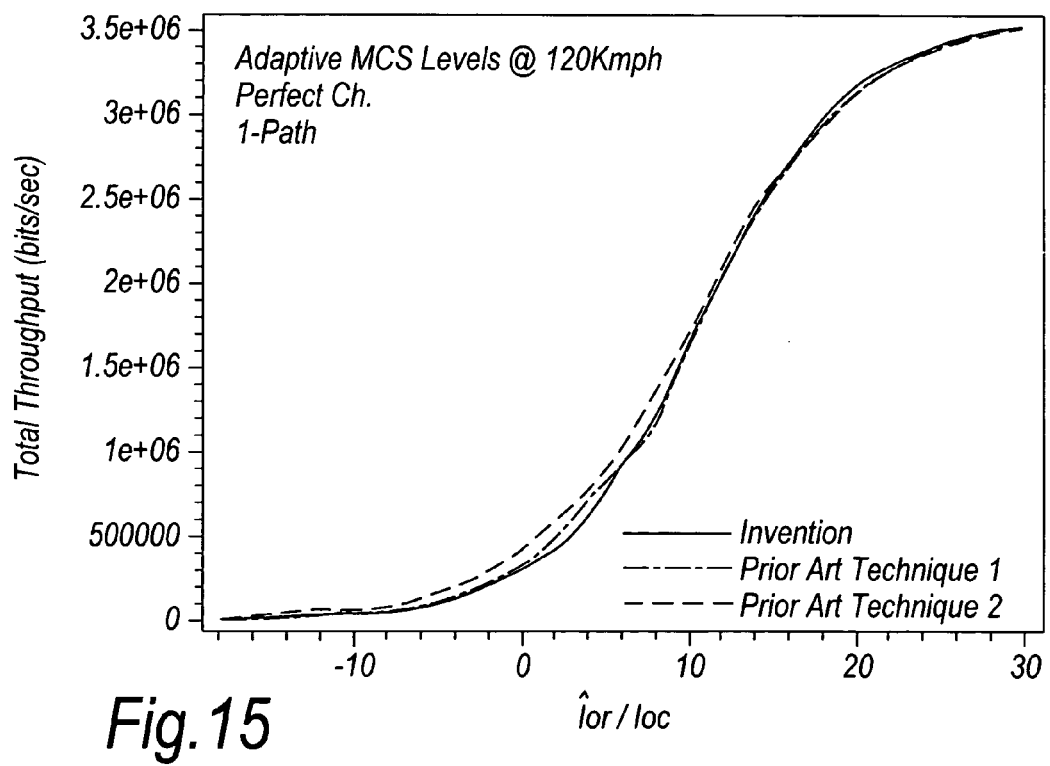

FIG. 15 shows the corresponding results for the three techniques, again under single path conditions, but with the UE moving at a high speed of 120 kph. It can be seen from FIGS. 14 and 15 that the three techniques have more or less comparable performance under single-path conditions.

Figure 16:
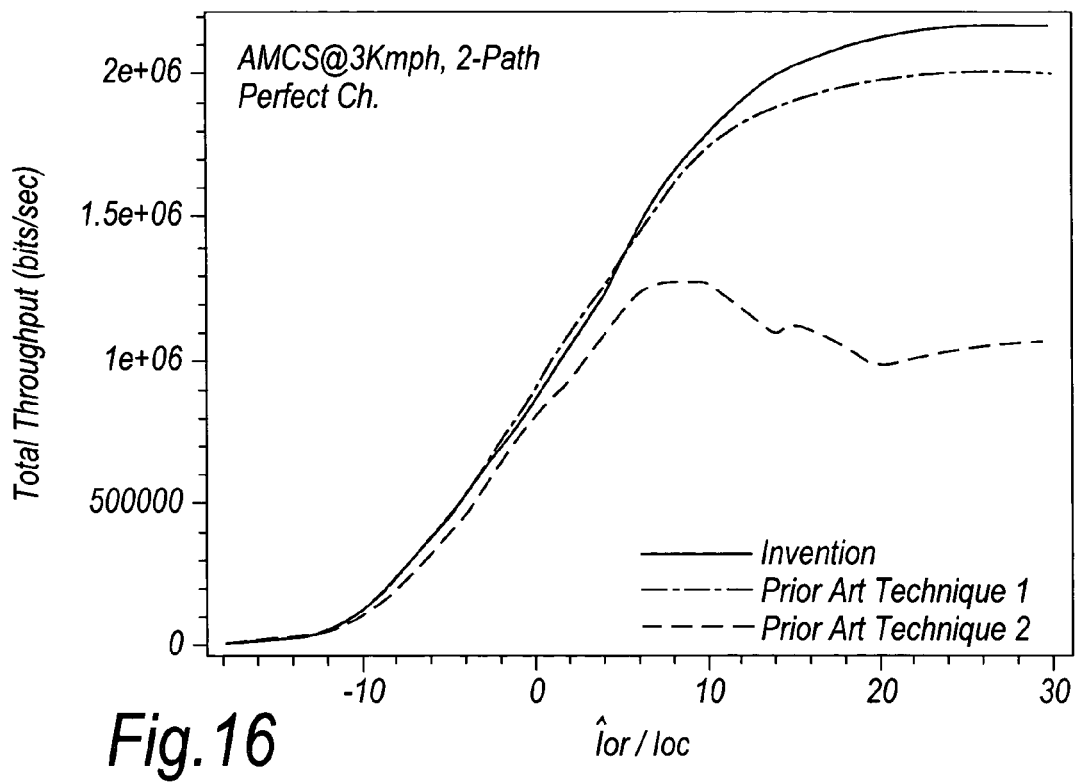
Figure 17:
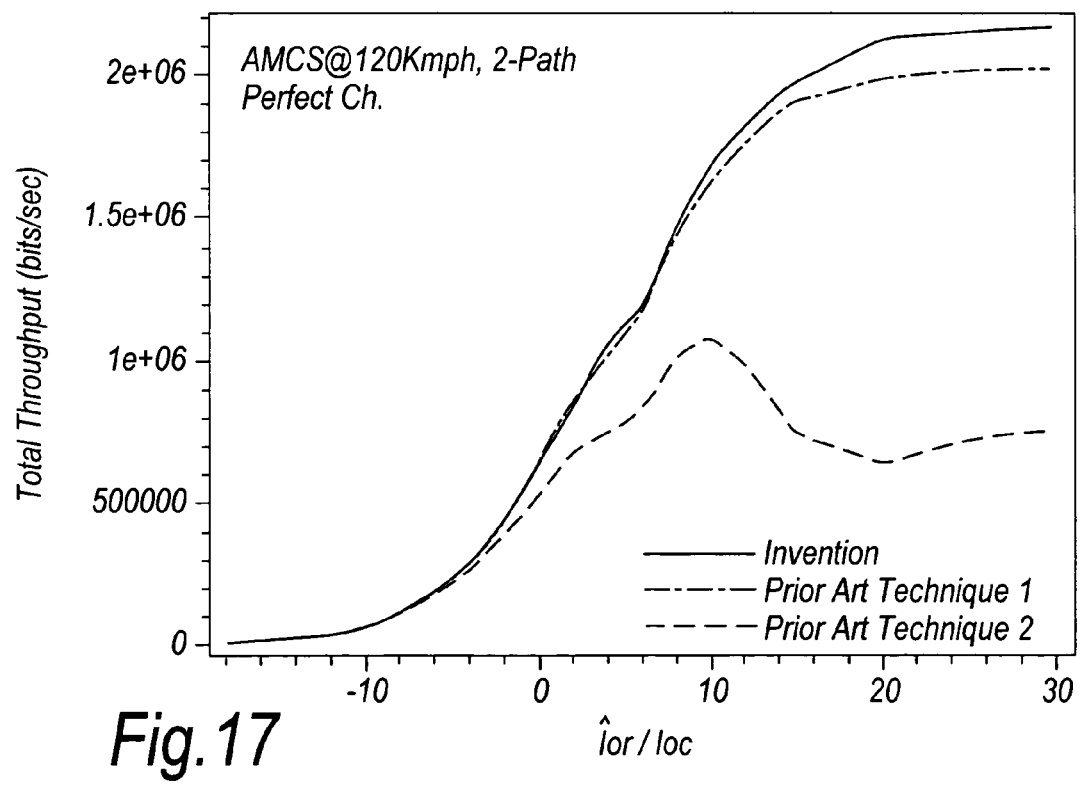

FIGS. 16 and 17 show results corresponding to those of FIGS. 14 and 15 but under two-equal-gain path conditions, as might prevail in an urban environment where there are many reflectors such as buildings. In FIG. 16, the UE is assumed to be moving at the low speed of 3 kph, whereas in FIG. 17 the UE is assumed to be moving at the high speed of 120 kph. It can be seen that under two-equal-gain path conditions, a method embodying the present invention significantly outperforms both the prior art techniques (1) and (2). In particular, compared to the prior art technique (2) a method embodying the present invention provides approximately 118% throughput improvement at a UE speed of 3 kph and 230% throughput improvement at 120 kph when the received signal power to interference and noise ratio is 20 dB ($\hat{I}_{or}/I_{oc}=20$ dB).

From simulations it is believed that the prior art technique (1) tends to track the fading much more tightly than a method embodying the present invention which means that the spread of the distribution of selected MCS levels is larger in prior art technique (1) than in an embodiment of the present invention. Also, the mean selected MCS level in a method embodying the present invention was higher than that of prior art technique (1) in the two-path simulation at 120 kph with mean SINR of 25 dB, even though the PER was the same, so that a greater throughput is achieved in the embodiment.

Figure 18:
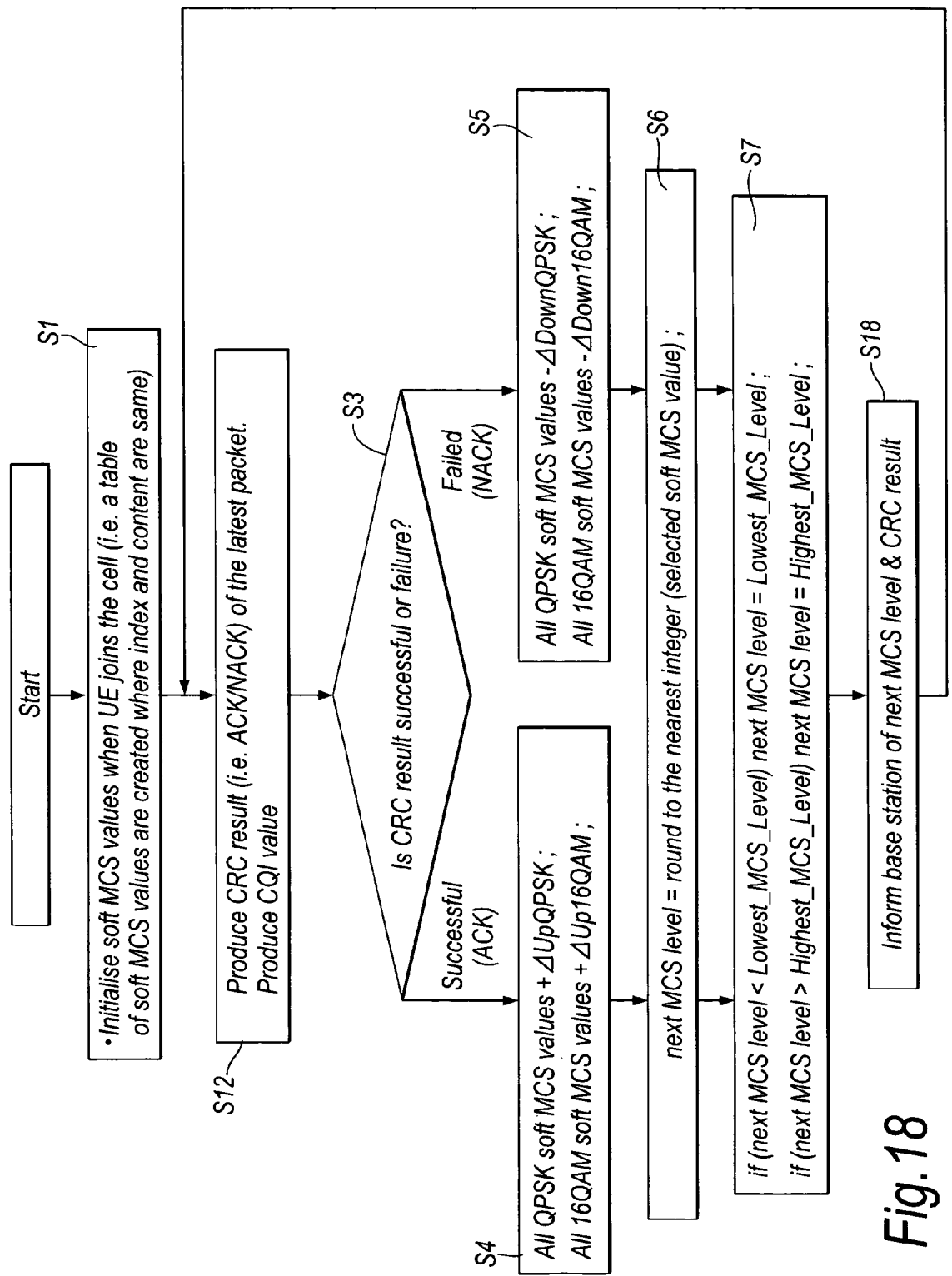
FIG. 18 is a flowchart for use in explaining an AMC method according to a second embodiment of the present invention.

In the first embodiment described with reference to FIGS. 10 to 12, the UE reports the CRC result and the CQI level to the base station, and the base station holds the soft MCS values table, updates the table based on the CRC result and decides the next MCS level. However, it is not necessary for the soft MCS values to be held or updated in the base station, nor is it necessary for the next MCS level to be decided by the base station. It is possible for these operations to be carried out in the UE, as will now be described in relation to a second embodiment of the present invention shown in FIG. 18.

In the second embodiment, the steps are the same as the steps S1 to S8 of the first embodiment except for the step S2 which is replaced by a step S12 and the step S8 which is replaced by a step S18.

As in the first embodiment, in step S1 a soft MCS values table is created when the UE joins the cell. In the second embodiment, this table is created inside the UE, rather than in the base station. In step S12, the UE produces the CRC result and a CQI value based on the latest received packet. Instead of reporting these to the base station at this stage, the UE itself carries out the steps S3 to S7 to select the MCS level for the next frame. Then, in step S18 the UE reports the selected MCS level and the CRC result to the base station using the HS-DPCCH.

Incidentally, in order to avoid delay in the CRC result reaching the base station, it is possible for the UE to report the CRC result to the base station in step S12, prior to carrying out the processing of steps S3 to S7.

Figure 10:
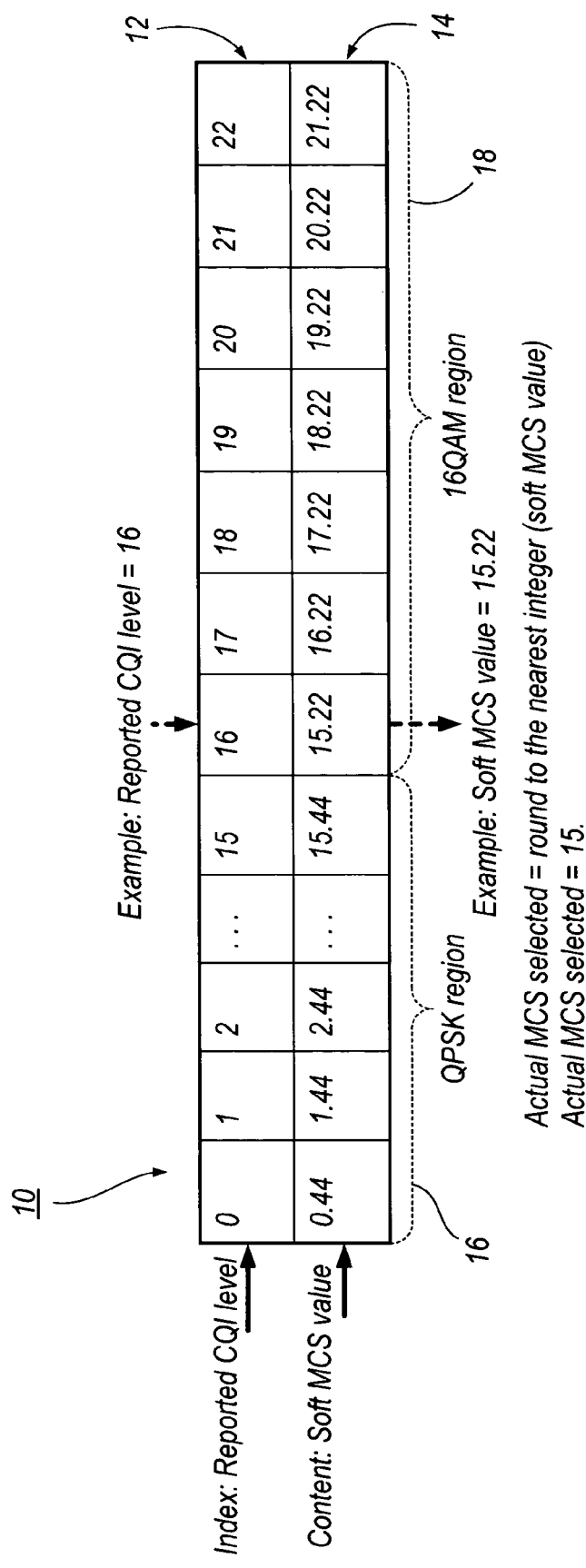
FIG. 10 is a schematic view of a table employed in a first embodiment of the present invention.

In the first and second embodiments described above, the soft MCS values are produced using a table of soft MCS values as shown in FIG. 10. The use of such a table has some significant advantages. Firstly, because the table stores the corresponding soft MCS value for each CQI value, it is possible to adjust the soft MCS values by different amounts, if desired. Thus, for example, instead of having a single upward and a single downward adjustment amount for all of the soft MCS values in the QPSK region 16 it would be possible to have individual adjustment amounts for each such soft MCS value. Alternatively, it would be possible to adjust only some of the soft MCS values in reaction to a particular CQI value, and leave others unchanged. Also, because all the soft MCS values are held in the table, retrieval and updating of the values can be quick and efficient. This is important as the processing power available may be limited, particularly in the case in which the table is held in the UE.

Nonetheless, despite these advantages, the requirement to hold the soft MCS values in table form may lead to an increased memory requirement, especially given that the soft MCS values are non-integer values. This disadvantage is overcome in a third embodiment of the present invention shown in FIG. 19.

Figure 19:
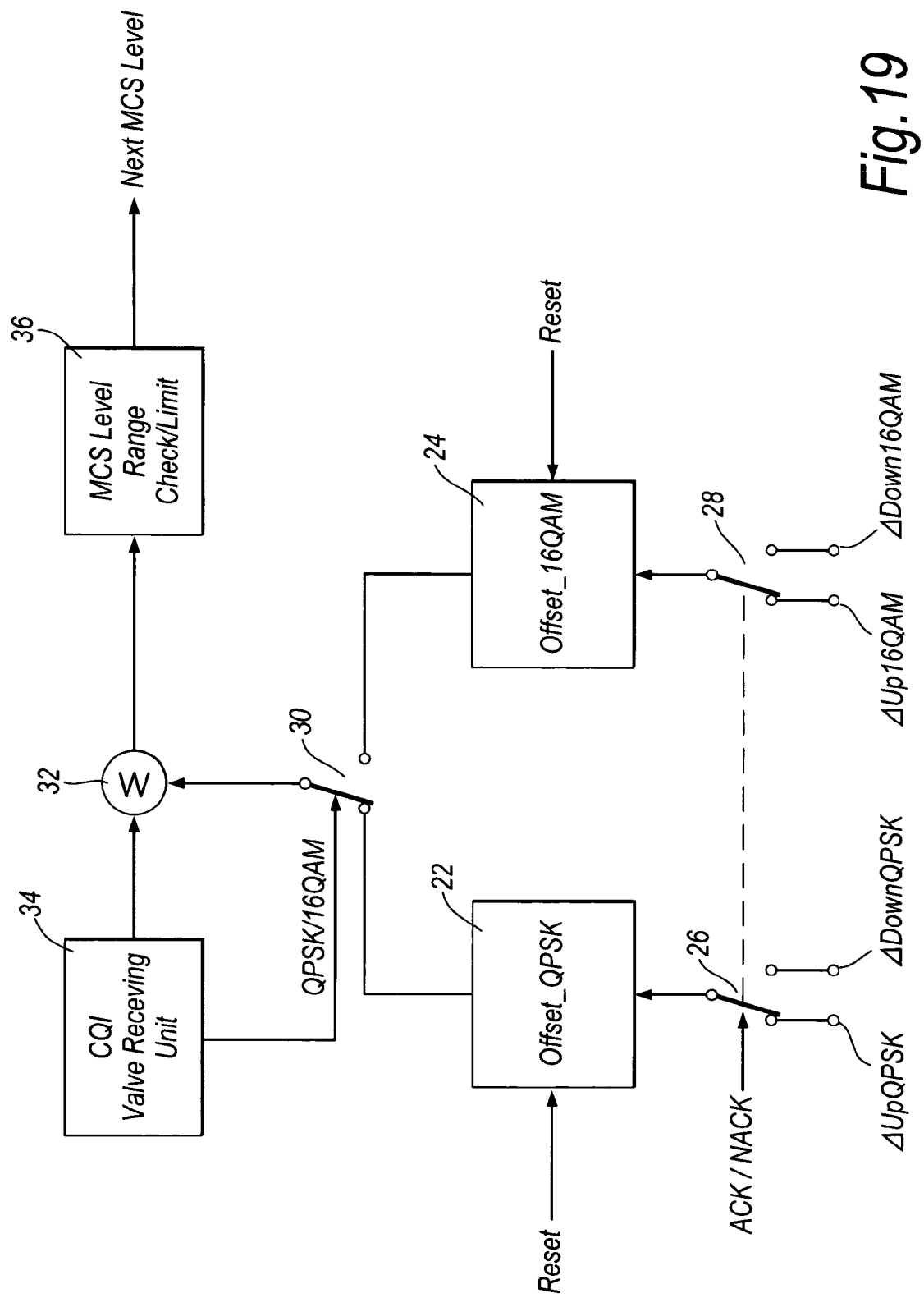
FIG. 19 is a schematic representation of an AMC apparatus according to a third embodiment of the present invention.

In FIG. 19, in place of the soft MCS values table, two parameters OFFSET_QPSK and OFFSET_16QAM are held and updated in respective offset units 22 and 24. The offset unit 22 has an input connected to an output of a first selection switch 26. The switch 26 has first and second inputs for receiving the first upward adjustment amount ΔUpQPSK and the first downward adjustment amount ΔDownQPSK respectively. The second offset unit 24 has an input connected to an output of a second selection switch 28. The switch 28 has first and second inputs connected for receiving the second upward adjustment amount ΔUp16QAM and the second downward adjustment amount ΔDown16QAM respectively. Each of the switches is controlled by the CRC result from the UE (ACK/NACK). In particular, each selection switch 26 and 28 selects its first input when the CRC result is a pass (ACK) and selects its second input when the CRC result is a fail (NACK).

Each of the first and second offset units 22 and 24 also has a RESET input and an output. The output of the first offset unit 22 is connected to a first input of a third selection switch 30. The output of the second offset unit 24 is connected to a second input of the switch 30. An output of the switch 30 is connected to input of an adder 32.

A CQI value receiving unit 34 is provided for receiving the latest CQI value produced by the UE. The latest received value is output by the unit 34 to another input of the adder 32. The CQI value receiving unit 34 also produces a control signal QPSK/16QAM which controls the selection switch 30. For example, when the latest CQI value held by the unit 34 is in the range from 0 to 15, the control signal QPSK/16QAM causes the switch 30 to select its first input, whereas when the latest CQI value is in the range from 16 to 22 the control signal QPSK/16QAM causes the selection switch 30 to select its second input.

An output of the adder 32 is supplied to an input of an MCS level range check/limit unit 36. The unit 36 outputs the next MCS level.

Operation of the third embodiment shown in FIG. 19 will now be described.

Firstly, when the UE joins the cell, the RESET inputs of the first and second offset units 22 and 24 are activated so that the parameters OFFSET_QPSK and OFFSET_16QAM are both reset to 0.

Then, in each frame, the CRC result is used to control the selection switches 26 and 28 so that either the upward adjustment amounts or the downward adjustment amounts are delivered to the inputs of the first and second offset units 22 and 24. Each offset unit 22 or 24 adds the received adjustment amount to the parameter OFFSET_QPSK or OFFSET_16QAM it holds. Note that the downward adjustment amounts are negative values in this embodiment.

Once the CQI value for the latest frame has been calculated, this is received in the CQI value receiving unit 34. In dependence upon the received value, the CQI value receiving unit 34 generates the appropriate control signal QPSK/16QAM to control the selection switch 30. Accordingly, the adder 32 either outputs the CQI value plus OFFSET_QPSK or the CQI value plus OFFSET_16QAM. The MCS level range check/limit unit 36 checks whether the output value from the adder is within the permitted range (as in step S7 of FIG. 11), limits the output value as appropriate, and outputs the value as the next MCS level.

Thus, in the third embodiment, even though there is no table of soft MCS values, each available MCS level still has a corresponding adjustable value (the parameter OFFSET_QPSK corresponding to MCS levels 0 to 15, or the parameter OFFSET_16QAM corresponding to MCS levels 16 to 22).

Although the embodiments described above have referred to only two types of modulation scheme, namely QPSK and 16 QAM, by way of example, it will be appreciated that embodiments of the present invention can be used with any suitable modulation schemes, including eight phase shift keying (8 PSK) and 64 quadrature amplitude modulation (64 QAM). The soft MCS values table can have as many regions as there are different modulation types. Alternatively, in the FIG. 23 embodiment, there can be as many offset units as there are different modulation types.

In the embodiments described above the transmitter was part of the base station and the receiver was part of the user equipment. However, in future networks it is likely that the user equipment will be capable of applying an AMC method to the uplink signals it transmits to the base station, in which case the methods of any of the preceding embodiments can be carried out with the transmitter being part of the user equipment and the receiver being part of the base station.

Although an example of the present invention has been described in relation to a wideband CDMA network having an asynchronous packet mode, it will be appreciated that the present invention can be applied to any other networks in which AMC can be used. These networks could be, or could be adapted from, other CDMA networks such as an IS95 network. These networks could also be, or be adapted from, other mobile communication networks not using CDMA, for example networks using one or more of the following multiple-access techniques: time-division multiple access (TDMA), wavelength-division multiple access (WDMA), frequency-division multiple access (FDMA) and space-division multiple-access (SDMA).

Those skilled in the art will appreciate that a microprocessor or digital signal processor (DSP) may be used in practice to implement some or all of the functions of the base station and/or user equipment in embodiments of the present invention.

What we claim is:

1. A method for an adaptive modulation and coding apparatus, said method comprising:
   holding one or more adjustable values, each corresponding to at least one of a plurality of available modulation and coding levels applicable to a data signal transmitted from a transmitter to a receiver, and each representing a change to the at least one level to which it corresponds;
   measuring reception quality of a pilot signal received by the receiver;
   adjusting one or more of said adjustable values in dependence upon whether or not the data signal is received successfully by the receiver; and
   selecting one of said available modulation and coding levels to apply to said data signal based on such an adjustable value and the measured reception quality, wherein there are at least two said adjustable values and said adjusting step comprises adjusting one said adjustable value by an amount different from an amount by which another said adjustable value is adjusted.

2. A method as claimed in claim 1, wherein the holding, adjusting and selecting steps are carried out by the transmitter.

3. A method as claimed in claim 1, wherein the receiver transmits to the transmitter an indication of whether or not the data signal was received successfully, and the transmitter adjusts one or more of the adjustable values in dependence upon the received indication.

4. A method as claimed in claim 1, wherein the adjusting step comprises increasing one or more of the adjustable values when the data signal is received successfully and decreasing one or more of said adjustable values when the data signal is not received successfully.

5. A method as claimed in claim 1, wherein an amount by which the one or more of said adjustable values is adjusted is dependent upon a target error rate.

6. A method as claimed in claim 1, further comprising:
proposing one of the available modulation and coding levels based on a signal transmission quality; and
selecting said modulation and coding level based on the adjustable value corresponding to the proposed modulation and coding level.

7. A method as claimed in claim 6, wherein the receiver produces a measure of said signal transmission quality, and the method further comprises employing a fixed mapping to map said measure to the proposed modulation and coding level.

8. A method as claimed in claim 6, wherein the proposing step is carried out by the receiver which transmits information specifying the proposed modulation and coding level to the transmitter.

9. A method as claimed in claim 1, wherein one of said transmitter and said receiver is a base station of a wireless communication system, and the other of said transmitter and said receiver is a user equipment of said system.

10. A method as claimed in claim 9, wherein said data signal is a packet access signal.

11. A method for an adaptive modulation and coding apparatus, said method comprising:
holding one or more adjustable values, each corresponding to at least one of a plurality of available modulation and coding levels applicable to a data signal transmitted from a transmitter to a receiver, and each representing a change to the at least one level to which it corresponds;
measuring reception quality of a pilot signal received by the receiver;
adjusting one or more of said adjustable values in dependence upon whether or not the data signal is received successfully by the receiver; and
selecting one of said available modulation and coding levels to apply to said data signal based on such an adjustable value and the measured reception quality, wherein the at least one adjustable value is a non-integer value and in the selecting step a rounded version of the or one said adjustable value is employed to select said modulation and coding level to apply to said data signal, said rounded version representing the nearest integer value to said non-integer adjustable value.

12. Adaptive modulation and coding apparatus comprising:
an adjustable value holding unit which holds one or more adjustable values, each corresponding to at least one of a plurality of available modulation and coding levels applicable to a data signal transmitted from a transmitter to a receiver, and each representing a change to the at least one level to which it corresponds;
a measuring unit which measures reception quality of a pilot signal received by the receiver;
an adjusting unit which adjusts one or more of said adjustable values in dependence upon whether or not the data signal is received successfully by the receiver; and a selecting unit which selects one of said available modulation and coding levels to apply to said data signal based on such an adjustable value and the measured reception quality,
wherein there are at least two said adjustable values and said adjusting unit adjusts one said adjustable value by an amount different from an amount by which another said adjustable value is adjusted, and
wherein at least one of the adjustable values is a non-integer value and the selecting unit employs a rounded version of the or one said adjustable value to select said modulation and coding level to apply to said data signal, said rounded version representing the nearest integer value to said non-integer adjustable value.

13. A machine-readable recording medium having recorded thereon an operating program which, when run on a processor in a transmitter of a wireless communication system, causes the transmitter to carry out the steps of:
holding one or more adjustable values, each corresponding to at least one of a plurality of available modulation and coding levels applicable to a data signal transmitted from said transmitter to a receiver of said system, and each representing a change to the at least one level to which it corresponds;
receiving, from the receiver, a channel quality indicator that is selected by the receiver based on reception quality of a pilot signal;
adjusting one or more of said adjustable values in dependence upon whether or not the signal is received successfully by said receiver; and
selecting one of said available modulation and coding levels to apply to said data signal based on such an adjustable value and the channel quality indicator,
wherein there are at least two said adjustable values and said adjusting step comprises adjusting one said adjustable value by an amount different from an amount by which another said adjustable value is adjusted, and
wherein at least one of the adjustable values is a non-integer value and in the selecting step a rounded version of the or one said adjustable value is employed to select said modulation and coding level to apply to said data signal, said rounded version representing the nearest integer value to said non-integer adjustable value.

14. A machine-readable recording medium having recorded thereon an operating program which, when run on a processor in a receiver of a wireless communication system, causes the receiver to carry out the steps of:
holding one or more adjustable values, each corresponding to at least one of a plurality of available modulation and coding levels applicable to a data signal transmitted from a transmitter of said system to said receiver, and each representing a change to the at least one level to which it corresponds;
measuring reception quality of a pilot signal received by the receiver;
adjusting one or more of said adjustable values in dependence upon whether or not the signal is received successfully by said receiver;
selecting one of said available modulation and coding levels based on such an adjustable value and the measured reception quality; and
transmitting to said transmitter information specifying the selected modulation and coding level,
wherein there are at least two said adjustable values and said adjusting step comprises adjusting one said adjustable value by an amount different from an amount by which another said adjustable value is adjusted, and wherein at least one of the adjustable values is a non-integer value and in the selecting step a rounded version of the or one said adjustable value is employed to select said modulation and coding level to apply to said data signal, said rounded version representing the nearest integer value to said non-integer adjustable value.

15. An adaptive modulation or coding scheme selecting method used in a mobile communication system including a transmitter that transmits pilot signals and data signals to a receiver, the method comprising:

measuring reception quality of the pilot signals by the receiver;

judging reception result of the data signals by the receiver;

adjusting, based on the reception result, one of at least two adjustable values, which respectively correspond to at least one of a plurality of available modulation and coding schemes, by an amount different from an amount by which another of said at least two adjustable values is adjusted; and selecting one of said available modulation and coding schemes to be adopted for data transmission by the transmitter based on the reception quality and such an adjustable value.

16. A transceiver that selects an adaptive modulation or coding scheme to transmit data signals to a receiver and transmits pilot signals to the receiver, the transceiver comprising:

a receiving unit to receive, from the receiver, a channel quality indicator that is selected by the receiver based on a reception quality of the pilot signals and to receive reception result of the data signals from the receiver;

an adjusting unit to adjust, based on the reception result, one of at least two adjustable values, which respectively correspond to at least one of a plurality of available modulation and coding schemes, by an amount different from an amount by which another of said at least two adjustable values is adjusted; and a transmitting unit to select one of said available modulation and coding schemes to be adopted for transmission of data based on the channel quality indicator and such an adjustable value.

17. A receiver that receives pilot signals and data signals transmitted respectively by a transmitter employing an adaptive modulation or coding scheme selection, the receiver comprising:

a receiving unit that receives the pilot signals and measures a reception quality of the pilot signals and receives the data signals and judges reception result of the data signals to generate a channel quality indicator based on the reception quality and the reception result; and a transmitting unit that transmits the channel quality indicator to the transmitter, wherein the transmitter adjusts, based on the reception result from the channel quality indicator, one of at least two adjustable values, which respectively correspond to at least one of a plurality of available modulation and coding schemes, by an amount different from an amount by which another of said at least two adjustable values is adjusted, and selects one of the plurality of available modulation and coding schemes based on such an adjustable value and the reception quality from the channel quality indicator received from the receiver.

18. An adaptive modulation or coding scheme selecting method used in a mobile communication system including a transmitter that transmits pilot signals and data signals to a receiver, the method comprising:

measuring reception quality of the pilot signals by the receiver;

judging reception result of the data signals by the receiver; and adjusting, based on the reception result, one or more adjustable values, which respectively correspond to at least one of a plurality of available modulation and coding schemes;

selecting one of the available modulation and coding schemes to be adopted for data transmission by the transmitter based on the reception quality and such an adjustable value, wherein at least one adjustable value is a non-integer value and in the selecting step a rounded version of the or one said adjustable value is employed to select said one of the available modulation and coding schemes, said rounded version representing the nearest integer value to said non-integer adjustable value.

19. A transceiver that selects an adaptive modulation or coding scheme to transmit data signals to a receiver and transmits pilot signals to the receiver, the transceiver comprising:

a receiving unit to receive, from the receiver, a channel quality indicator that is selected by the receiver based on a reception quality of the pilot signals and to receive reception result of the data signals from the receiver;

an adjusting unit to adjust, based on the reception result, one or more adjustable values, which respectively correspond to at least one of a plurality of available modulation and coding schemes; and a transmitting unit to select one of the available modulation and coding schemes to be adopted for transmission of data based on the channel quality indicator and such an adjustable value, wherein at least one adjustable value is a non-integer value and a rounded version of the or one said adjustable value is employed to select said one of the available modulation and coding schemes, said rounded version representing the nearest integer value to said non-integer adjustable value.

20. A receiver that receives pilot signals and data signals transmitted respectively by a transmitter employing an adaptive modulation or coding scheme selection, the receiver comprising:

a receiving unit that receives the pilot signals and measures a reception quality of the pilot signals and receives the data signals and judges reception result of the data signals to generate a channel quality indicator based on the reception quality and the reception result; and a transmitting unit that transmits the channel quality indicator to the transmitter, wherein the transmitter adjusts, based on the reception result from the channel quality indicator, at least one adjustable value, which corresponds to at least one of a plurality of available modulation and coding schemes, and selects one of the plurality of available modulation and coding schemes based on such an adjustable value and the reception quality from the channel quality indicator received from the receiver, and wherein the at least one adjustable value is a non-integer value and a rounded version of the or one said adjustable value is employed to select said one of the plurality of available modulation and coding schemes, said rounded version representing the nearest integer value to said non-integer adjustable value.

* * * * *

UNITED STATES PATENT AND TRADEMARK OFFICE
CERTIFICATE OF CORRECTION

PATENT NO. : 7,590,181 B2 Page 1 of 1
APPLICATION NO. : 10/901901
DATED : September 15, 2009
INVENTOR(S) : Awad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Twenty-first Day of September, 2010

David J. Kappos
*Director of the United States Patent and Trademark Office*